United States Patent
Yang et al.

(10) Patent No.: US 11,514,886 B2
(45) Date of Patent: Nov. 29, 2022

(54) EMOTION CLASSIFICATION INFORMATION-BASED TEXT-TO-SPEECH (TTS) METHOD AND APPARATUS

(71) Applicant: LG ELECTRONICS INC., Seoul (KR)

(72) Inventors: Siyoung Yang, Seoul (KR); Yongchul Park, Seoul (KR); Juyeong Jang, Seoul (KR); Jonghoon Chae, Seoul (KR); Sungmin Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 486 days.

(21) Appl. No.: 16/485,421

(22) PCT Filed: Jan. 11, 2019

(86) PCT No.: PCT/KR2019/000453
§ 371 (c)(1),
(2) Date: Aug. 12, 2019

(87) PCT Pub. No.: WO2020/145439
PCT Pub. Date: Jul. 16, 2020

(65) Prior Publication Data
US 2021/0366462 A1 Nov. 25, 2021

(51) Int. Cl.
*G10L 13/08* (2013.01)
*G10L 13/027* (2013.01)
*G10L 13/033* (2013.01)

(52) U.S. Cl.
CPC ............ *G10L 13/08* (2013.01); *G10L 13/027* (2013.01); *G10L 13/033* (2013.01)

(58) Field of Classification Search
CPC ......... G10L 13/00; G10L 13/02; G10L 13/08; G10L 13/10; G10L 13/027; G10L 13/033;
(Continued)

(56) References Cited

U.S. PATENT DOCUMENTS 9,117,446 B2    8/2015  Bao et al.
10,467,792 B1*  11/2019 Roche ................... G06F 40/20
(Continued)

FOREIGN PATENT DOCUMENTS

EP          3151239          4/2017
KR         10-1160193         6/2012
KR       10-2015-0087023      7/2015

OTHER PUBLICATIONS

Y. Douiji, H. Mousanif, I-CARE: Intelligent Context Aware system for Recognizing Emotions from text, 2015, IEEE, 2015 10th International Conference on Intelligent Systems: Theories and Applications (SITA) (Year: 2015).*

(Continued)

*Primary Examiner* — Edgar X Guerra-Erazo
*Assistant Examiner* — Alexander Joongie Kim
(74) *Attorney, Agent, or Firm* — Lee, Hong, Degerman, Kang & Waimey PC

(57) ABSTRACT

Disclosed are an emotion classification information-based text-to-speech (TTS) method and device. The emotion classification information-based TTS method according to an embodiment of the present invention may, when emotion classification information is set in a received message, transmit metadata corresponding to the set emotion classification information to a speech synthesis engine and, when no emotion classification information is set in the received message, generate new emotion classification information through semantic analysis and context analysis of sentences in the received message and transmit the metadata to the speech synthesis engine. The speech synthesis engine may perform speech synthesis by carrying emotion classification information based on the transmitted metadata.

9 Claims, 18 Drawing Sheets

"Where are you?"

(a)
| Neutral | Love | Happy | Anger | Sad |
|---------|------|-------|-------|-----|
| 1.0     | 0.0  | 0.0   | 0.0   | 0.0 |

" Where are you? ^^"

(b)
| Neutral | Love | Happy | Anger | Sad |
|---------|------|-------|-------|-----|
| 0.0     | 0.6  | 0.4   | 0.0   | 0.0 |

"Where are you? ——;;"

(c)
| Neutral | Love | Happy | Anger | Sad |
|---------|------|-------|-------|-----|
| 0.0     | 0.0  | 0.0   | 0.8   | 0.2 |

(58) Field of Classification Search
CPC ........ G10L 25/63; G10L 25/75; G06F 40/117; G06F 40/14; G06F 40/143; G06F 40/30
See application file for complete search history.

(56) References Cited

U.S. PATENT DOCUMENTS

| | | | |
|---|---|---|---|
| 2011/0184721 A1* | 7/2011 | Subramanian | G10L 19/0018 704/4 |
| 2015/0046164 A1* | 2/2015 | Maganti | G10L 13/04 704/260 |
| 2016/0071510 A1 | 3/2016 | Li et al. | |

OTHER PUBLICATIONS

P. Taylor, A. Isard, "SSML: A speech synthesis markup language", 1996, Centre for Speech Technology Research, Speech Communication vol. 21 (Year: 1996).*

E. Eide, "Preservation, identification, and use of emotion in a text-to-speech system", 2002, Proceedings of 2002 IEEE Workshop on Speech Synthesis (Year: 2002).*

PCT International Application No. PCT/KR2019/000453, International Search Report dated Oct. 11, 2019, 3 pages.

* cited by examiner

FIG. 10

(a) Love you —— M1

(b)
| Neutral (EA1) | Love (EA2) | Happy (EA3) | Anger (EA4) | Sad (EA5) |
|---|---|---|---|---|
| 0.0 | 0.9 | 0.1 | 0.0 | 0.0 |

Emotion Vector

FIG. 11

"Where are you?"

(a)

| Neutral | Love | Happy | Anger | Sad |
|---------|------|-------|-------|-----|
| 1.0     | 0.0  | 0.0   | 0.0   | 0.0 |

" Where are you? ^^"

(b)

| Neutral | Love | Happy | Anger | Sad |
|---------|------|-------|-------|-----|
| 0.0     | 0.6  | 0.4   | 0.0   | 0.0 |

"Where are you? ——;;"

(c)

| Neutral | Love | Happy | Anger | Sad |
|---------|------|-------|-------|-----|
| 0.0     | 0.0  | 0.0   | 0.8   | 0.2 |

FIG. 12

(a)
Previous sentence: "Miss you"
Current sentence: "Where are you?"
                         |
                        M22

| Neutral | Love | Happy | Anger | Sad |
|---------|------|-------|-------|-----|
| 0.0     | 1.0  | 0.0   | 0.0   | 0.0 |

(b)
Previous sentence: "You are already late"
Current sentence: "Where are you?"
                         |
                        M22

| Neutral | Love | Happy | Anger | Sad |
|---------|------|-------|-------|-----|
| 0.0     | 0.0  | 0.0   | 0.8   | 0.2 |

FIG. 13

Previous sentence: "Miss you"
Current sentence: "Where are you?^^" — M3

EV = Ws * EVs + Wc * Evc

EV = Ws *    EVs      + Wc *    EVc

| Neutral | Love | Happy | Anger | Sad |
|---|---|---|---|---|
| 0.0 | 0.6 | 0.4 | 0.0 | 0.0 |

EV = 0.4 * [above] + 0.6 *

| Neutral | Love | Happy | Anger | Sad |
|---|---|---|---|---|
| 0.0 | 1.0 | 0.0 | 0.0 | 0.0 |

EV =

| Neutral | Love | Happy | Anger | Sad |
|---|---|---|---|---|
| 0.0 | 0.84 | 0.16 | 0.0 | 0.0 |

FIG. 15

```
<?xml version="1.0"?>
<speak version="1.1" xmlns="http://www.w3.org/2001/10/synthesis"
     xml:lang ="ko - KR">
     <s> <emotion="happy"> I will wait.</emotion> </s>
     <s> <emotion="love" Love you.</emotion> </s>
</speak>
```

EMOTION CLASSIFICATION INFORMATION-BASED TEXT-TO-SPEECH (TTS) METHOD AND APPARATUS

CROSS-REFERENCE TO RELATED APPLICATIONS

This application is the National Stage filing under 35 U.S.C. 371 of International Application No. PCT/KR2019/000453, filed on Jan. 11, 2019, the contents of which are all hereby incorporated by reference herein in its entirety.

TECHNICAL FIELD

The present invention relates to a text-to-speech (TTS) device and method, and more particularly to a TTS device and method which enables a speech having emotion contents to be output.

BACKGROUND ART

A conventional Text-To-Speech (TTS) processing outputs a text with a pre-stored voice. The primary purpose of the TTS processing is to transmit semantic contents, but recently there is emerging need that the TTS processing transmits not just semantic contents of a text but also interactive contents of the text to a counterpart, so that intent or emotion of a user actually sending the text is reflected in a voice output, thereby allowing interactive conversation with the actual text sender.

DISCLOSURE

Technical Problem

The present invention aims to address the above-described need and/or problem.

In addition, the present invention aims to perform speech synthesis so as to output a speech in which intent of a user is reflected.

In addition, the present invention aims to perform emotion containing speech synthesis with emotion contained.

In addition, the present invention aims to perform speech synthesis with emotion contained, by analyzing semantic content and context information of a message to be sent.

Technical Solution

An emotion classification information-based test-to-speech (TTS) method according to one aspect of the present invention includes: receiving a message; determining as to whether emotion classification information is set in the received message; when first emotion classification information is set in the message, transmitting first metadata corresponding to the first emotion classification information to a speech synthesis engine; when no emotion classification information is set in the message, generating second emotion classification information based on semantic analysis and context analysis of the message and transmitting second metadata corresponding to the second emotion classification to the speech synthesis engine; and synthesizing, by the speech synthesis engine, a speech corresponding to the message by adding emotion classification information that is determined based on any one of the first metadata and the second metadata.

The first emotion classification information may be set distinguishably from an input of the message.

The first metadata and the second metadata may be in markup language, and the markup language comprises speech synthesis markup language (SSML).

The SSML may include an element representing an emotion attribute, and the emotion attribute may include at least one of neutral, love, happy, anger, sad, worry or sorry.

The generating of the second emotion classification information may include: transmitting the message to a semantic analysis module and a context analysis module; transmitting, by the semantic analysis module, to an emotion classification information determination module, a first emotion vector that is calculated based on an emotion element included in the message, by which emotion can be inferred; and transmitting, by the context analysis module, to the emotion classification information determination module, a second emotion vector that is calculated based on overall context of the message.

The emotion classification determination module may be further configured to: determine the second emotion classification information, which is to be reflected in speech synthesis, based on the first emotion vector and the second emotion vector; and generate the second metadata corresponding to the second emotion classification information and deliver the second metadata to the speech synthesis engine.

The first emotion vector may be defined as weights of which a sum is normalized and assigned to the plurality of emotion attributes, and the second emotion vector is defined as weights of which a sum is normalized and assigned to the plurality of emotion attributes.

The determining of the second emotion classification information may further include: summing up a first emotion vector with a first weight assigned thereto and a second emotion vector with a second weight assigned thereto; and selecting an emotion attribute having a greatest value as a result of the summing as the second emotion classification information.

The first weight and the second weight may be adaptively changed as a result of analysis of semantics and context of the message, and the method may further include: when emotion representation is included in the message, increasing the first weight; and, when multiple sentences forming the message has a continuity, increasing the second weight, and the first weight and the second weight may be defined through normalization.

The first weight and the second weight may be stored as a history for a person who sends the message.

The weights assigned to the multiple emotion attributes forming the first emotion vector may be assigned in consideration of a symbol or graphic object included in the message as a result of inferring of semantic contents included in the message.

The weights assigned to the multiple emotion attributes forming the second emotion vector may be assigned in consideration of context between sentences, by which a flow of the context can be inferred.

The emotion element by which emotion can be inferred is defined as at least one of a character, a symbol, or a graphic object included in the received message.

An emotion classification information-based text-to-speech (TTS) method according to another embodiment of the present invention includes: receiving a message from a transmitting device; and, when it is determined that emotion classification information is set in the message, defining metadata corresponding to the emotion classification information in speech synthesis markup language (SSML) and transmitting the metadata together with the message to a TTS device.

A text-to-speech (TTS) device enabling multiple speakers to be set according to yet another aspect of the present invention includes: a communication unit configured to receive a message; a speech synthesis unit configured to synthesize a speech corresponding to the message; and a processor configured to, based on whether emotion classification information is set in the received message, control the speech synthesis unit to perform speech synthesis based on the emotion classification information, wherein the processor is configured to: when first emotion classification information is set in the message, deliver first metadata corresponding to the first emotion classification information to the speech synthesis unit; and, when no emotion classification information is set in the message, generate second emotion classification information based on semantic analysis and context analysis of the message and deliver second metadata corresponding to the second emotion classification to the speech synthesis unit, wherein the speech synthesis unit is configured to synthesize a speech corresponding to the message by adding emotion classification information that is determined based on any one of the first metadata and the second metadata.

An emotion classification information-based text-to-speech (TTS) system according to yet another aspect of the present invention includes: a transmitting device configured to transmit a message; a server configured to define metadata, which corresponds to emotion classification information extracted through semantic analysis and context analysis of the message received from the transmitting device, in speech synthesis markup language (SSML) and transmit the metadata together with the message; and a TTS device configured to synthesize a speech in which the emotion classification information is reflected based on the metadata.

A computing device according to yet another aspect of the present invention includes: a processor; and a memory including an instruction executable by the processor, and the instruction is used to determine as to whether emotion classification information is set in the received message and, when a first emotion classification information is set in the message, transmit first metadata corresponding to the first emotion classification information to a speech synthesis engine and, when no emotion classification information is set in the message, generate second emotion classification information based on at least one of an emotion element included in the message, by which emotion can be inferred, or context of the message and transmit second metadata corresponding to the second emotion classification information to the speech synthesis engine, and the speech synthesis engine synthesizes a speech corresponding to the message by adding emotion classification information that is determined based on any one of the first metadata and the second metadata.

Advantageous Effects

An emotion classification information text-to-speech (TTS) method and device according to the present invention have effects as below.

The present invention may realize speech synthesis which enables outputting of a speech in which intent of a sender is reflected.

In addition, the present invention may realize speech synthesis with emotion contained therein.

In addition, the present invention may output a message with emotion contained in each sentence by analyzing semantic contents and context information of a message to be transmitted.

Additional ranges of possibilities will become apparent from the following detailed description. It should be understood, however, that the detailed description and specific examples, such as the preferred embodiments of the invention, are given by way of illustration only, since various changes and modifications within the spirit and scope of the invention will be apparent to those skilled in the art.

DESCRIPTION OF DRAWINGS

FIG. 10 is a diagram for explaining an emotion vector according to an embodiment of the present invention.

FIG. 11 shows another example of calculating a first emotion vector by analyzing semantics of a message when no emotion classification information is set in a received message according to an embodiment of the present invention.

FIG. 12 shows an example of calculating a second emotion vector by analyzing context of a received message when no emotion classification information is set in the received message according to an embodiment of the present invention.

FIG. 13 shows an example of determining final emotion classification information based on a first emotion vector and a second emotion vector when no emotion classification information is set in a received message according to an embodiment of the present invention.

FIG. 15 shows an example in which emotion classification information is described in SSML according to an embodiment of the present invention.

MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
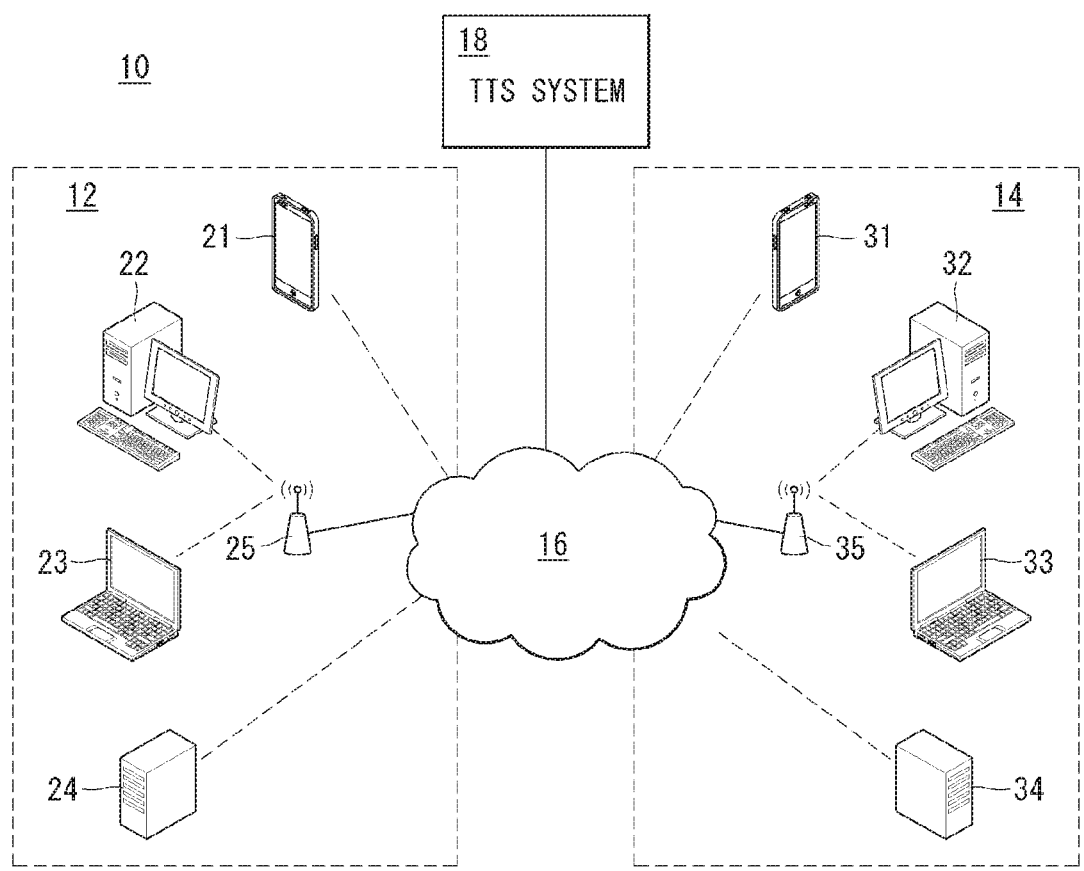
FIG. 1 is a block diagram of a communication system according to a preferred embodiment of the present invention.

FIG. 1 is a block diagram of a communication system according to a preferred embodiment of the present invention.

Referring to FIG. 1, the communication system may include at least one transmitting device 12, at least one receiving device 14, at least one network system 16 for connecting the at least one transmitting device 12 to the at least one receiving device 14, and a text-to-speech (TTS) system 18 serving as a Speech Synthesis Engine.

The at least one transmitting device 12 and the at least one receiving device 14 may include a mobile phone 21 and 31, a smart phone, a personal digital assistants (PDA), a portable multimedia player (PMP), a navigation device, an ultrabook, a wearable device (e.g., a smartwatch, a smart glass, a head mounted display (HMD)), etc.

The at least one transmitting device 12 and the at least one receiving device 14 may further include slate PCs 22 and 32, a tablet PC, laptop computers 23 and 33, etc. The slate PCs 22 and 32 and the laptop computers 23 and 33 may be connected to the at least one network system 16 via wireless access points 25 and The at one transmitting device 12 and the at least one receiving device 14 may be referred to as client devices.

Figure 2:
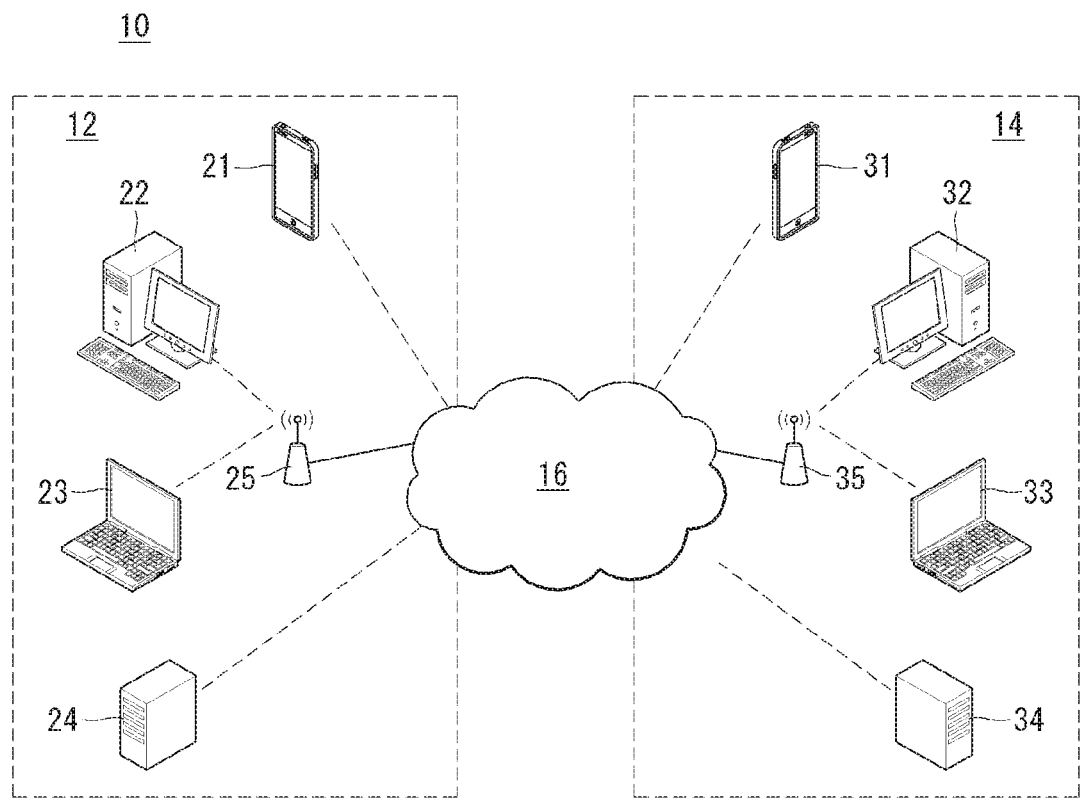
FIG. 2 is a block diagram of a communication system according to another embodiment of the present invention.

FIG. 2 is a block diagram of a communication system according to another embodiment of the present invention. The communication system shown in FIG. 2 is similar to the communication system shown in FIG. 1, except for the TTS system. An omitted TTS system may be included in the at least one transmitting device 12. That is, unlike the environment in FIG. 1, FIG. 2 shows that a TTS system is able to be implemented in the transmitting device 12 so that the TTS system can be implemented by on-device processing FIGS. 1 and 2 illustrate exemplary embodiments of the present invention. FIGS. 1 and 2 are to provide a context where characteristics of the present invention can be realized. A detailed description about one or more system architectures for implementing the system may be provided a different part of the present specification, an integrated application program or the like. In addition, it is preferable that each of the respective communication systems shown in FIGS. 1 and 2 includes a communication network in terms of text messaging, and it is preferable that each of the communication systems 10 shown in FIGS. 1 and 2 includes the Internet in context of instant messaging.

Figure 3:
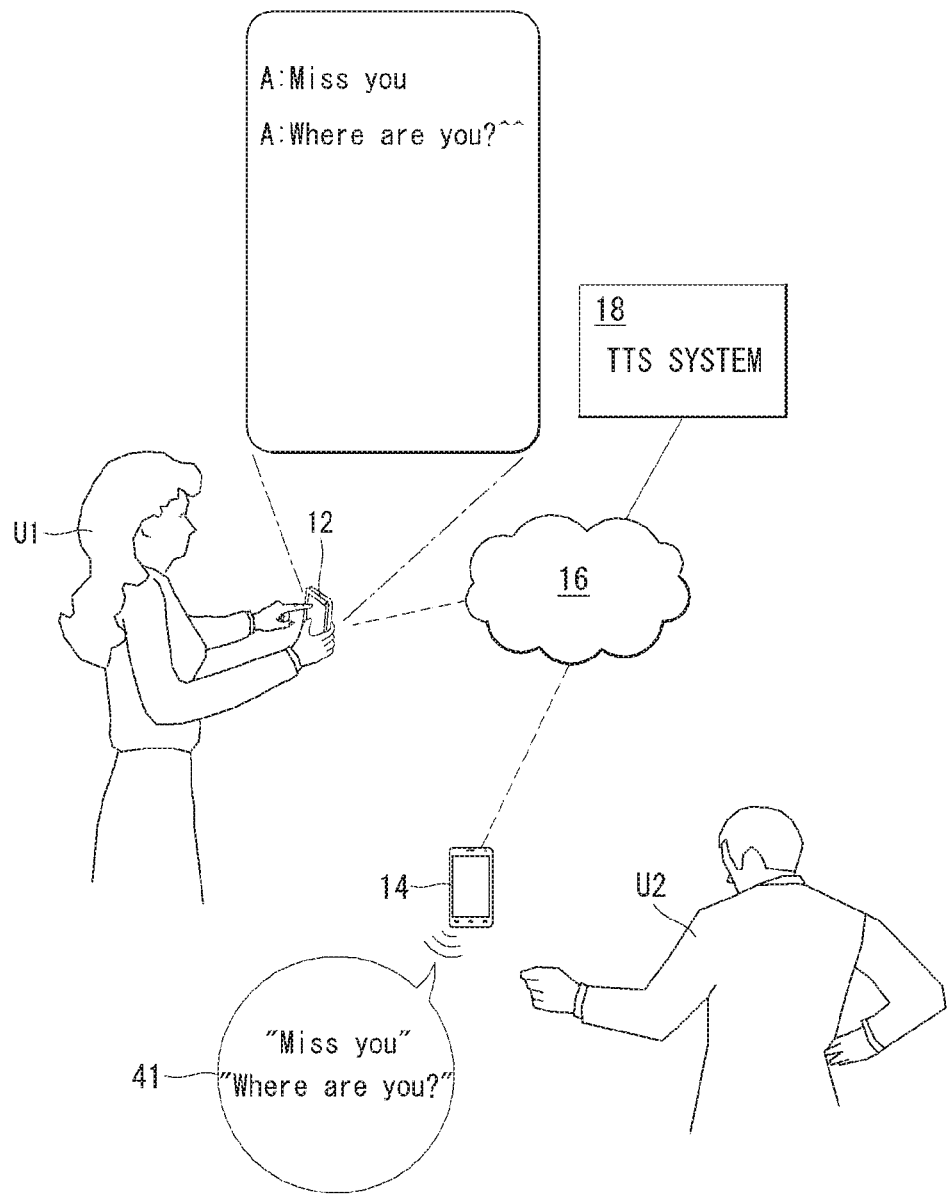
FIG. 3 shows communication between two users through a part of the communication system shown in FIG. 1.

FIG. 3 shows communication between two users U1 and U2 through a part of the communication system shown in FIG. 1.

Referring to FIG. 3, a first user U1, who can be called a transmitting user, may communicate with a second user U2, who can be called a receiving user, through a transmitting device 12 and a receiving device 14. The first user U1 may disclose a text message (e.g., Miss you. Where are you? :)) to be transmitted to the second user U2 through the receiving device 14 through the transmitting device 12 of the first user U1. In addition, in terms of text messaging, a first user U1 may transmit an instant message through an Instant Messaging (IM) client, and a second user U2 may receive the instant message on the receiving device 14 through the IM client.

The message transmitted by the first user U1 may be transmitted to a TTS system 18. The speech synthesis engine of the TTS system may convert the message into a speech. The second user U2 may hear a speech synthesized in correspondence to the received message and output from the TTS system 18 through the receiving device 14. The transmitting device 12 and the receiving device 14 may include a microphone, a speaker, and a display.

Figure 4:
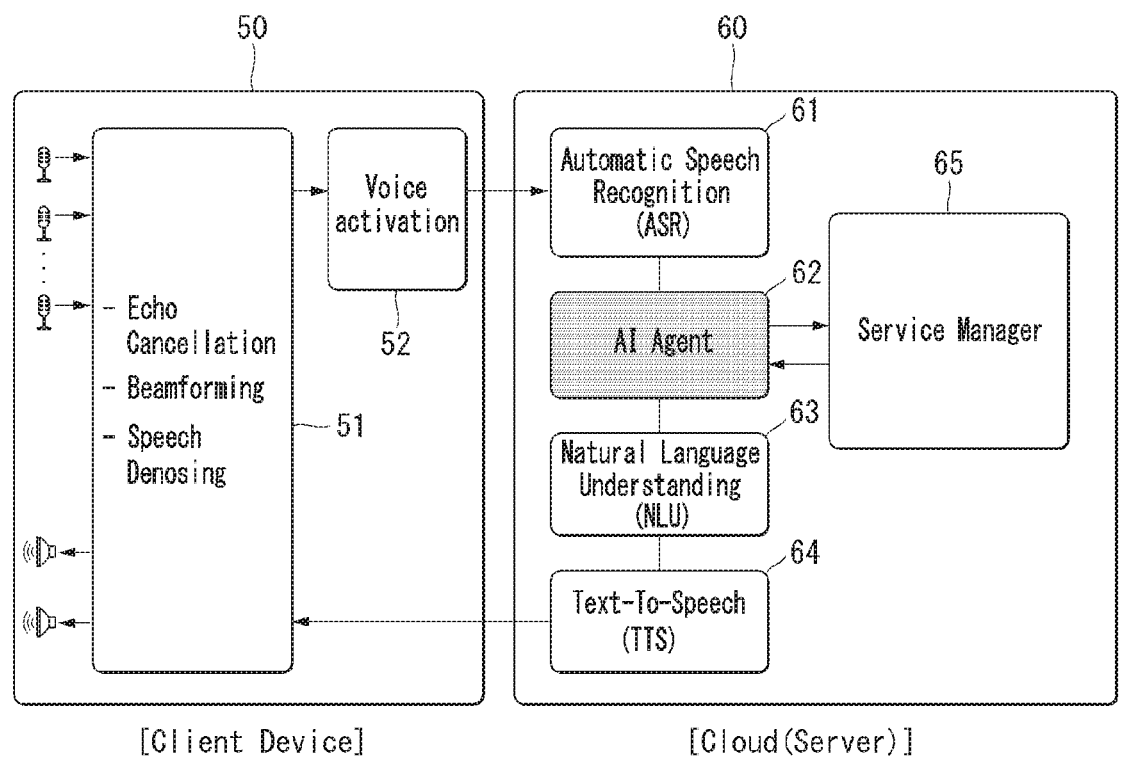
FIG. 4 shows a schematic block diagram of a text-to-speech (TTS) device in a TTS system according to an embodiment of the present invention.

Hereinafter, a speech processing procedure performed by a device environment and/or a cloud environment or server environment will be described with reference to FIGS. 4 and 5. FIG. 4 shows an example in which, while a speech can be received in a device 50, a procedure of processing the received speech and thereby synthesize the speech, that is, overall operations of speech synthesis, is performed in a cloud environment 60. On the contrary, FIG. 5 shows an example of on-device processing indicating that a device 70 performs the aforementioned overall operations of speech synthesis by processing a received speech and thereby synthesizing the speech.

Figure 5:
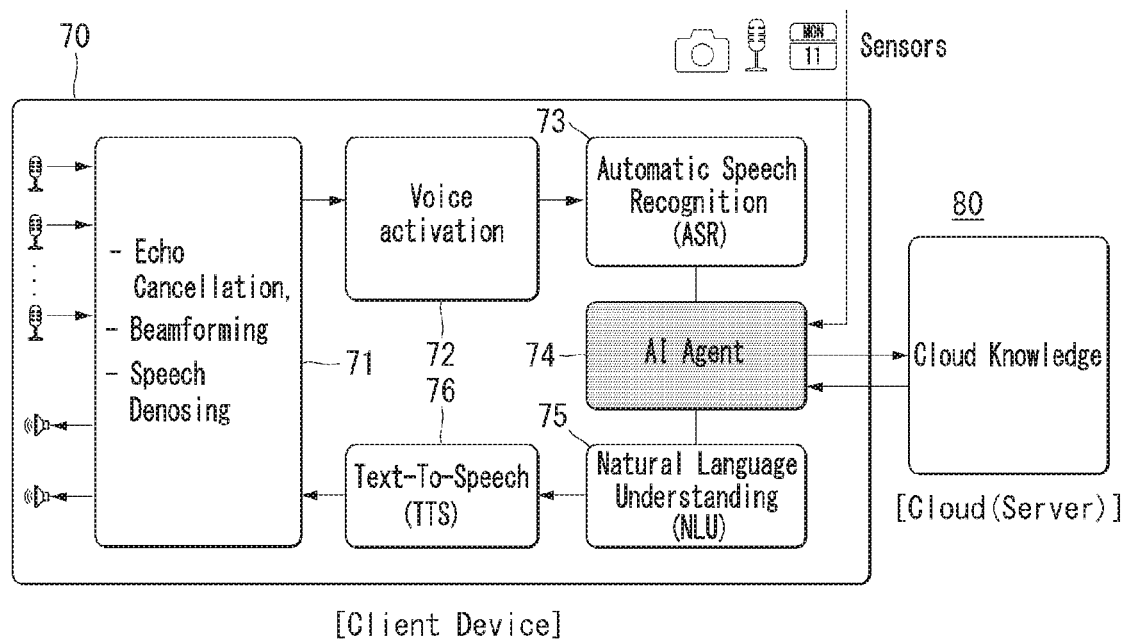
FIG. 5 is a schematic block diagram of a TTS device in a TTS system environment according to an embodiment of the present invention.

In FIGS. 4 and 5, the device environments 70 may be referred to as client devices, and the cloud environments 60 and 80 may be referred to as servers.

FIG. 4 shows a schematic block diagram of a text-to-speech (TTS) device in a TTS system according to an embodiment of the present invention.

In order to process a speech event in an end-to-end speech UI environment, various configurations are required. A sequence for processing the speech event performs signal acquisition playback, speech pre-processing, voice activation, speech recognition, natural language processing, and speech synthesis by which a device responds to a user.

The client device 50 may include an input module. The input module may receive a user input from a user. For example, the input module may receive the user input from an external device (e.g., a keyboard and a headset) connected thereto. In addition, for example, the input module may include a touch screen. In addition, for example, the input module may include a hardware key located in a user terminal.

According to an embodiment, the input module may include at least one microphone capable of receiving a user's utterance as a speech signal. The input module may include a speech input system and receive a user's speech as a speech signal through the speech input system. By generating an input signal for an audio input, the at least one microphone may determine a digital input signal for a user's speech. According to an embodiment, multiple microphones may be implemented as an array. The array may be arranged in a geometric pattern, for example, a linear geometric shape, a circular geometric shape, or a different random shape. For example, the array may be in a pattern in which four sensors are placed at 90 degrees to receive sound from four directions. In some embodiments, the microphone may include sensors of different arrays in a space of data communication, and may include a networked array of the sensors. The microphone may include an omnidirectional microphone and a directional microphone (e.g., a shotgun microphone).

The client device 50 may include a pre-processing module 51 capable of pre-processing a user input (speech signal) that is received through the input module (e.g., a microphone).

The pre-processing module 51 may include an adaptive echo canceller (AEC) function to thereby remove echo included in a user speech signal received through the microphone. The pre-processing module 51 may include a noise suppression (NS) function to thereby remove background noise included in a user input. The pre-processing module 51 may include an end-point detect (EPD) function to thereby detect an end point of a user speech and thus find out where the user speech exists. In addition, the pre-processing module 51 may include an automatic gain control (AGC) function to thereby control volume of the user speech in such a way suitable for recognizing and processing the user speech.

The client device 50 may include a voice activation module 52. The voice activation module 52 may recognize a wake-up call indicative of recognition of a user's call. The voice activation module 52 may detect a predetermined keyword (e.g., Hi LG) from a user input which has been pre-processed. The voice activation module 52 may remain in a standby state to perform an always-on keyword detection function.

The client device 50 may transmit a user voice input to a cloud server. ASR and natural language understanding (NLU) operations, which are essential to process a user speech, is generally performed in Cloud due to computing, storage, power limitations, and the like. The Cloud may include the cloud device 60 that processes a user input transmitted from a client. The cloud device 60 may exists as a server.

The cloud device 60 may include an auto speech recognition (ASR) module 61, an artificial intelligent agent 62, a natural language understanding (NLU) module 63, a text-to-speech (TTS) module 64, and a service manager 65.

The ASR module 61 may convert a user input, received from the client device 50, into textual data.

The ASR module 61 includes a front-end speech pre-processor. The front-end speech pre-processor extracts a representative feature from a speech input. For example, the front-perform a Fourier transform on the speech input to extract spectral features that characterize the speech input as a sequence of representative multi-dimensional vectors. In addition, The ASR module 61 may include one or more speech recognition modules (e.g., an acoustic model and/or a language module) and may realize one or more speech recognition engines. Examples of the speech recognition model include Hidden Markov Models, Gaussian-Mixture Models, Deep Neural Network Models, n-gram language models, and other statistical models. Examples of the speech recognition model include a dynamic time warping (DTW)-based engine and a weighted finite state transducer (WFST)-based engine. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens).

Once the ASR module 61 generates a recognition result including a text string (e.g., words, or sequence of words, or sequence of tokens), the recognition result is transmitted to the NLP module 63 for intention deduction. In some examples, The ASR module 61 generates multiple candidate text expressions for a speech input. Each candidate text expression is a sequence of works or tokens corresponding to the speech input.

The NLU module 63 may perform a syntactic analysis or a semantic analysis to determine intent of a user. The syntactic analysis may be used to divide a user input into syntactic units (e.g., words, phrases, morphemes, or the like) and determine whether each divided unit has any syntactic element. The semantic analysis may be performed using semantic matching, rule matching, formula matching, or the like. Thus, the NLU module 63 may obtain a domain, intent, or a parameter (or a slot) necessary to express the intent from a user input through the above-mentioned analysis.

According to an embodiment, the NLU module 63 may determine the intent of the user and a parameter using a matching rule which is divided into a domain, intent, and a parameter. For example, one domain (e.g., an alarm) may include a plurality of intents (e.g., alarm setting, alarm release, and the like), and one intent may need a plurality of parameters (e.g., a time, the number of iterations, an alarm sound, and the like). The plurality of rules may include, for example, one or more mandatory parameters. The matching rule may be stored in a natural language understanding database.

According to an embodiment, the NLU module 63 may determine a meaning of a word extracted from a user input using a linguistic feature (e.g., a syntactic element) such as a morpheme or a phrase and may match the determined meaning of the word to the domain and intent to determine the intent of the user. For example, the NLU module 63 may determine the intent of the user by calculating how many words extracted from a user input are included in each of the domain and the intent. According to an embodiment, the NLU module 63 may determine a parameter of the user input using a word which is the basis for determining the intent. According to an embodiment, the NLU module 63 may determine the intent of the user using a NLU DB which stores the linguistic feature for determining the intent of the user input. According to another embodiment, the NLU module 63 may determine the intent of the user using a personal language model (PLM). For example, the NLU module 63 may determine the intent of the user using personalized information (e.g., a contact list, a music list, schedule information, social network information, etc.). For example, the PLM may be stored in, for example, the NLU DB. According to an embodiment, the ASR module 61 as well as the NLU module 63 may recognize a voice of the user with reference to the PLM stored in the NLU DB.

According to an embodiment, the NLU module 63 may further include a natural language generating module (not shown). The natural language generating module may change specified information to a text form. The information changed to the text form may be a natural language speech. For example, the specified information may be information about an additional input, information for guiding the completion of an action corresponding to the user input, or information for guiding the additional input of the user. The information changed to the text form may be displayed in a display after being transmitted to the client device or may be changed to a voice form after being transmitted to the TTS module.

The TTS module 64 may convert text input to voice output. The TTS module 64 may receive text input from the NLU module 63 of the LNU module 63, may change the text input to information in a voice form, and may transmit the information in the voice form to the client device 50. The client device 50 may output the information in the voice form via the speaker.

The speech synthesis module 64 synthesizes speech outputs based on a provided text. For example, a result generated by the ASR module 61 may be in the form of a text string. The speech synthesis module 64 may convert the text string to an audible speech output. The speech synthesis module 64 may use any appropriate speech synthesis technique in order to generate speech outputs from text, including, but not limited to, concatenative synthesis, unit selection synthesis, diphone synthesis, domain-specific synthesis, formant synthesis, articulatory synthesis, hidden Markov model (HMM) based synthesis, and sinewave synthesis.

In some examples, the speech synthesis module 64 may be configured to synthesize individual words based on phonemic strings corresponding to the words. For example, a phonemic string can be associated with a word in a generated text string. The phonemic string can be stored in metadata associated with the word. The speech synthesis model 64 may be configured to directly process the phonemic string in the metadata to synthesize the word in speech form.

Since the cloud environment generally has more processing capabilities or resources than the client device, a higher quality speech output may be acquired in synthesis on the client side. However, the present invention is not limited thereto, and the speech synthesis process may be performed on the client side (see FIG. 5).

Meanwhile, according to an embodiment, the client environment may further include an Artificial Intelligence (AI) agent 62. The AI agent 62 is defined to perform at least some of the above-described functions performed by the ASR module 61, the NLU module 63 and/or the TTS module 64. In addition, the AI module 62 may make contribution so that the ASR module 61, the NLU module 63 and/or the TTS module 64 perform independent functions, respectively.

The AI agent module 62 may perform the above-described functions through deep learning. The deep learning represents a certain data in a form readable by a computer (e.g., when the data is an image, pixel information is represented as column vectors or the like), and efforts are being made to conduct enormous researches for applying the representation to learning (which is about how to create better representation techniques and how to create a model that learns the better representation techniques), and, as a result, various deep learning techniques such as deep neural networks (DNN), convolutional deep neural networks (CNN), Recurrent Boltzmann Machine (RNN), Restricted Boltzmann Machine (RBM), deep belief networks (DBN), and Deep Q-Network, may be applied to computer vision, speech recognition, natural language processing, speech/signal processing, and the like.

Currently, all commercial speech recognition systems (Microsoft's Cortana, Skype translator, Google Now, Apple Siri, etc.). are based on deep learning techniques.

In particular, the AI agent module 62 may perform various natural language processes, including machine translation, emotion analysis, and information retrieval, to process natural language by use of a deep artificial neural network architecture.

Meanwhile, the cloud environment may include a service manager 65 capable of collecting various personalized information and supporting a function of the AI agent 62. The personalized information acquired through the service manager may include at least one data (a calendar application, a messaging service, usage of a music application, etc.) used through the cloud environment, at least one sensing data (a camera, a microphone, temperature, humidity, a gyro sensor, C-V2X, a pulse, ambient light, Iris scan, etc.) collected by the client device 50 and/or the cloud 60, off device data directly not related to the client device 50. For example, the personalized information may include maps, SMS, news, music, stock, weather, Wikipedia information.

For convenience of explanation, the AI agent 62 is represented as an additional block to be distinguishable from the ASR module 61, the NLU module 63, and the TTS module 64, but the AI agent 62 may perform at least some or all of the functions of the respective modules 61, 62, and 64.

In FIG. 4, an example in which the AI agent 62 is implemented in the cloud environment due to computing calculation, storage, power limitations, and the like, but the present invention is not limited thereto.

For example, FIG. 5 is identical to what is shown in FIG. 4, except for a case where the AI agent is included in the cloud device.

FIG. 5 is a schematic block diagram of a TTS device in a TTS system environment according to an embodiment of the present invention. A client device 70 and a cloud environment 80 shown in FIG. 5 may correspond to the client device 50 and the cloud device 60 aforementioned in FIG. 4, except for some configurations and functions. Accordingly, description about specific functions of corresponding blocks may refer to FIG. 4.

Referring to FIG. 5, the client device 70 may include a pre-processing module 51, a voice activation module 72, an ASR module 73, an AI agent 74, an NLU module 75, and a TTS module 76. In addition, the client device 50 may include an input module (at least one microphone) and at least one output module.

In addition, the cloud environment may include cloud knowledge 80 that stores personalized information in a knowledge form.

A function of each module shown in FIG. 5 may refer to FIG. 4. However, since the ASR module 73, the NLU module 75, and the TTS module 76 are included in the client device 70, communication with Cloud may not be necessary for a speech processing procedure such as speech recognition, speech synthesis, and the like, and thus, an instant real-time speech processing operation is possible.

Each module shown in FIGS. 4 and 5 are merely an example for explaining a speech processing procedure, and modules more or less than in FIGS. 4 and 5 may be included. In addition, two or more modules may be combined or different modules or modules with different arrangement structures may be included. The various modules shown in FIGS. 4 and 5 may be implemented in hardware, software instructions for execution by one or more processors, firmware, including one or more signal processing and/or application specific integrated circuits, or a combination thereof.

Figure 6:
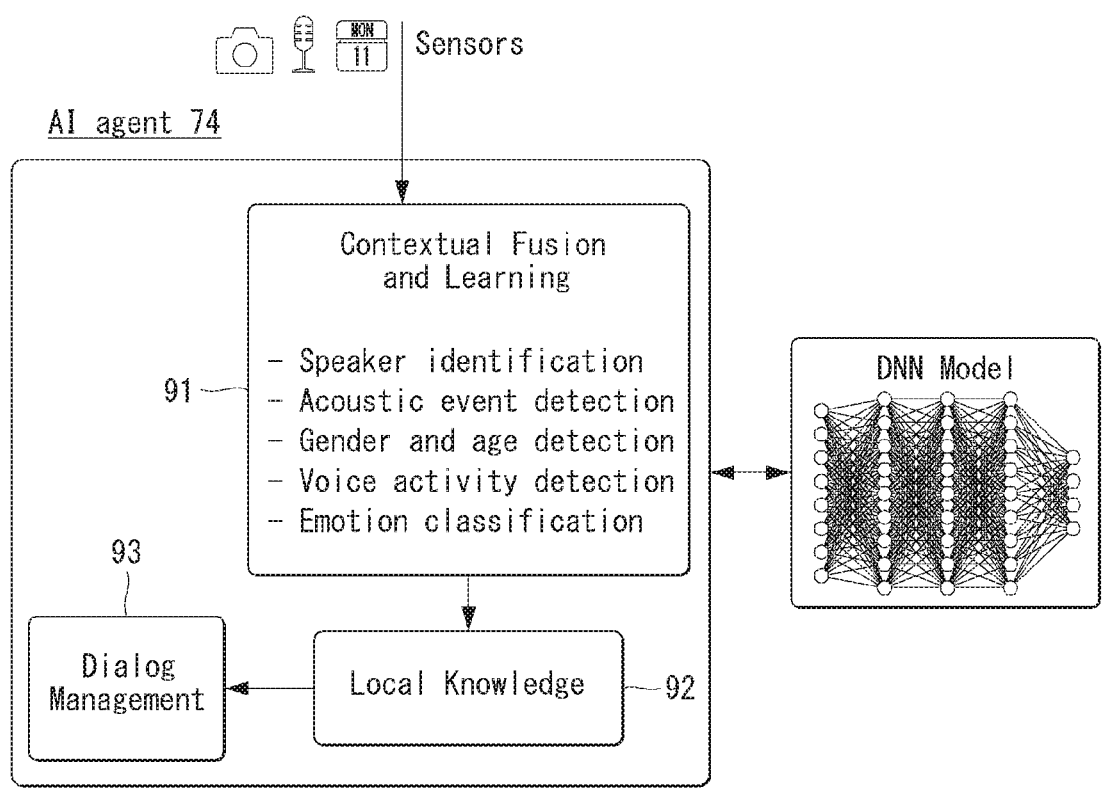
FIG. 6 is a schematic block diagram of an AI agent capable of performing emotion classification information-based TTS according to an embodiment of the present invention.

FIG. 6 is a schematic block diagram of an AI agent capable of performing emotion classification information-based TTS according to an embodiment of the present invention.

Referring to FIG. 6, in the speech processing procedure described with reference to FIGS. 4 and 5, the AI agent 74 may support an interactive operation with a user, in addition to an ASR operation, an NLU operation, and a TTS operation. Alternatively, using context information, the AI agent 74 may make contribution so that the NLU module 63 further clarify, complements, or additionally define information included in text expressions received from the ASR module 61.

Here, the context information may include preference of a user of a client device, hardware and/or software states of the client device, various types of sensor information received before, during, or after a user input, previous interactions (e.g., dialogue) between the AI agent and the user, etc. In the present disclosure, the context information is dynamic and varies depending on time, location, contents of the dialogue, and other elements.

The AI agent 74 may further include a context fusion and learning module 91, a local knowledge 92, and a dialogue management 93.

The context fusion and learning module 91 may learn a user's intent based on at least one data. The at least one data may further include at least one sensing data acquired by a client device or a cloud environment. In addition, the at least one data may further include speaker identification, acoustic event detection, a speaker's personal information (gender and age detection), voice activity detection (VAD), and emotion classification information.

The speaker identification may indicate specifying a speaker in a speaker group registered by a speech. The speaker identification may include identifying a pre-registered speaker or registering a new speaker. The acoustic event detection may outdo a speech recognition technique and may be used to recognize acoustics itself to recognize a type of sound and a place where the sound occurs. The VAD is a speech processing technique of detecting presence or absence of a human speech (voice) from an audio signal that can include music, noise, or any other sound. According to an embodiment, the AI agent 74 may detect presence of a speech from the input audio signal. According to an embodiment the AI agent 74 differentiates a speech data and a non-speech data using a deep neural networks (DNN) model. In addition, the AI agent 74 may perform emotion classification information on the speech data using the DNN model. According to the emotion classification information, the speech data may be classified as anger, boredom, fear, happiness, or sadness.

The context fusion and learning module 91 may include a DNN model to perform the above-described operation, and may determine intent of a user input based on sensing information collected in the DNN model, the client device or the cloud environment.

The at least one data is merely an example and may include any data that can be referred to so as to determine intent of a user in a speech processing procedure. The at least one data may be acquired through the above-described DNN model.

The AI agent 74 may include the local knowledge 92. The local knowledge 92 may include user data. The user data may include a user's preference, the user's address, the user's initially set language, the user's contact list, etc. According to an embodiment, the AI agent 74 may additionally define the user's intent by complementing information included in the user's speech input using the user's specific information. For example, in response to the user's request "Invite my friends to my birthday party", the AI agent 74 does not request more clarified information from the user and may utilize the local knowledge 92 to determine who "the friends" are and when and where the "birthday" takes place.

The AI agent 74 may further include the dialogue management 93. The AI agent 74 may provide a dialogue interface to enable speech conversation with the user. The dialogue interface may refer to a procedure of outputting a response to the user's speech input through a display or a speaker. Here, a final result output through the dialogue interface may be based on the ASR operation, the NLU operation, and the TTS operation, which are described above.

Figure 7:
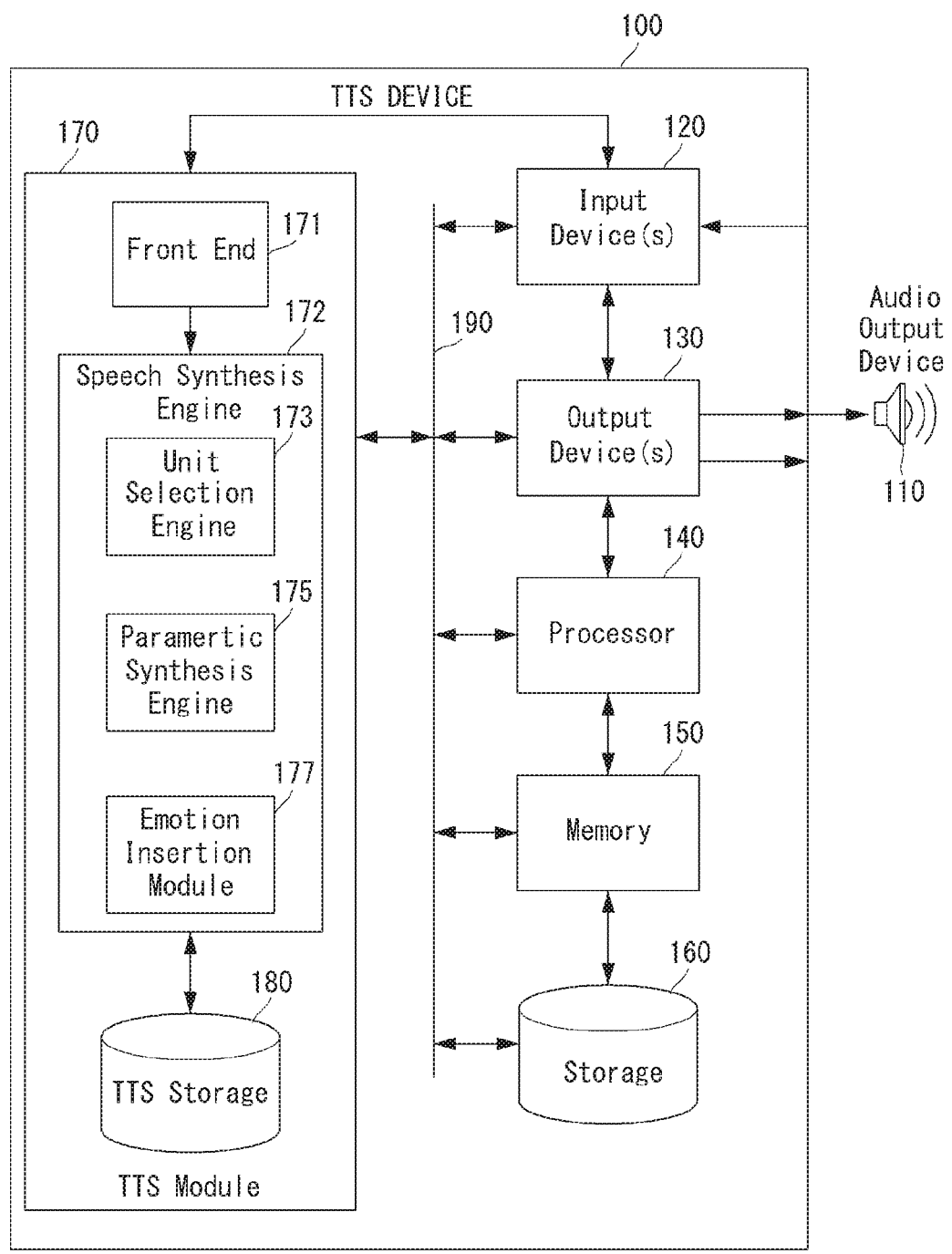
FIG. 7 is another block diagram of an emotion classification information-based TTS device according to an embodiment of the present invention.

FIG. 7 is another block diagram of an emotion classification information-based TTS device according to an embodiment of the present invention.

A TTS device 100 shown in FIG. 7 may include an audio output device 110 for outputting a speech processed by the TTS device 100 or by a different device.

FIG. 7 discloses the TTS device 100 for performing speech synthesis. An embodiment of the present invention may include computer-readable and computer-executable instructions that can be included in the TTS device 100. Although FIG. 7 discloses a plurality of elements included in the TTS device 100, configurations not disclosed herein may be included in the TTS device 100.

Meanwhile, some configurations disclosed in the TTS device 100 may be single configurations and each of them may be used multiple times in one device. For example, the TTS device 100 may include a plurality of input devices 120, an output device 130 or a plurality of controllers/processors 140.

A plurality of TTS devices may be applied to one TTS device. In such a multiple device system, the TTS device may include different configurations to perform various aspects of speech synthesis. The TTS device shown in FIG. 7 is merely an exemplary, may be an independent device, and may be implemented as one configuration of a large-sized device or system.

According to an embodiment of the present invention, a plurality of difference devices and a computer system may be, for example, applied to a universal computing system, a server-client computing system, a telephone computing system, a laptop computer, a mobile terminal, a PDA, and a tablet computer, etc. The TTS device 100 may be applied as a different device providing a speech recognition function, such as ATMs, kiosks, a Global Positioning System (GPS), a home appliance (e.g., a refrigerator, an oven, a washing machine, etc.), vehicles, ebook readers, etc. or may be applied as a configuration of the system.

Referring to FIG. 7, the TTS device 100 may include a speech output device 110 for outputting a speech processed by the TTS device 100 or by a different device. The speech output device 110 may include a speaker, a headphone, or a different appropriate configuration for transmitting a speech. The speech output device 110 may be integrated into the TTS device 100 or may be separated from the TTS device 100.

The TTS device 100 may include an address/data bus for transmitting data to configurations of the TTS device 100. The respective configurations in the TTS device 100 may be directly connected to different configurations through the bus. Meanwhile, the respective configurations in the TTS device 100 may be directly connected to a TTS module 170.

The TTS device 100 may include a controller (processor) 140. A controller 140 may correspond to a CPU for processing data and a memory for storing computer-readable instructions to process data and storing the data and the instructions. The memory 150 may include a volatile RAM, a non-volatile ROM, or a different-type memory.

The TTS device 100 may include a storage 160 for storing data and instructions. The storage 160 may include a magnetic storage, an optical storage, a solid-state storage, etc.

The TTS device 100 may access a detachable or external memory (e.g., a separate memory card, a memory key drive, a network storage, etc.) through an input device 120 or an output device 130.

Computer instructions to be processed by the processor 140 to operate the TTS device 100 and various configurations may be executed by the processor 140 and may be stored in the memory 150, the storage 160, an external device, or a memory or storage included in the TTS module 170 described in the following. Alternatively, all or some of executable instructions may be added to software and thus embedded in hardware or firmware. An embodiment of the present invention may be, for example, implemented as any of various combinations of software, firmware and/or hardware.

The TTs device 100 includes the input device 120 and the output device 130. For example, the input device a microphone, a touch input device, a keyboard, a mouse, a stylus, or the audio output device 100 such as a different input device. The output device 130 may include a visual display or tactile display, an audio speaker, a headphone, a printer, or any other output device. The input device 120 and/or the output device 130 may include an interface for connection with an external peripheral device, such as a Universal Serial Bus (USB), FireWire, Thunderbolt, or a different access protocol. The input device 120 and/or the output device 130 may include a network access such as an Ethernet port, a modem, etc. The input device 120 and/or the output device may include a wireless communication device such as radio frequency (RF), infrared rays, Bluetooth, wireless local area network (WLAN) (e.g., WiFi and the like) or may include a wireless network device such as a 5G network, a long term evolution (LTE) network, a WiMAN network, and a 3G network. The TTS device 100 may include the Internet or a distributed computing environment through the input device 120 and/or the output device 130.

The TTS device 100 may include the TTS module 170 for processing textual data into audio waveforms including speeches.

The TTS module 170 may access to the bus, the input device 120, the output device 130, the audio output device 110, the processor 140, and/or a different configuration of the TTS device 100.

The textual data may be generated by an internal configuration of the TTS device 100. In addition, the textual data may be received from an input device such as a keyboard or may be transmitted to the TTS device 100 through a network access. A text may be a type of a sentence including a text, a number and/or a punctuation to convert into a speech by the TTS module 170. An input text may include a special annotation for processing by the TTS module 170 and may use the special annotation to indicate how a specific text is to be pronounced. The textual data may be processed in real time or may be stored or processed later on.

The TTS module 170 may include a front end 171, a speech synthesis engine 172, and a TTS storage 180. The front end 171 may convert input textual data into symbolic linguistic representation for processing by the speech synthesis engine 172. The speech synthesis engine 172 may convert input text into a speech by comparing annotated phonetic unit models and information stored in the TTS storage 180. The front end 171 and the speech synthesis engine 172 may include an embedded internal processor or memory, or may use a processor 140 included in the TTS device 100 or a memory. Instructions for operating the front end 171 and the speech synthesis engine 172 may be included in the TTS module 170, the memory 150 of the TTS device 100, the storage 160, or an external device.

Input of a text into the TTS module 170 may be transmitted to the front end 171 for a processing. The front end 171 may include a module for performing text normalization, linguistic analysis, and linguistic prosody generation.

While performing the text normalization, the front end 171 may process a text input and generate a standard text to thereby convert numbers, abbreviations, and symbols identically.

While performing the linguistic analysis, the front end 171 may generate language of a normalized text to generate a series of phonetic units corresponding to an input text. This process may be referred to as phonetic transcription. The phonetic units include symbol representation of sound units that are lastly coupled and output by the TTS device 100 as a speech. Various sound units may be used to divide a text for speech synthesis. The TTS module 170 may process a speech based on phonemes (individual acoustics), half-phonemes, di-phones (the last half of a phoneme coupled to a half of a neighboring phoneme), bi-phones (two continuous phones), syllables, words, phrases, sentences, or other units. Each word may be mapped to one or more phonetic units. Such mapping may be performed using a language dictionary stored in the TTS device 100.

Linguistic analysis performed by the front end 171 may include a process of identifying different syntactic elements, such as prefixes, suffixes, phrases, punctuations, and syntactic boundaries. Such syntactic elements may be used to output a natural audio waveform by the TTS module 170. The language dictionary may include letter-to-sound rules and other tools for pronouncing a previously unidentified word or letter combination that can be made by the TTS module 170. In general, the more the information is included in the language dictionary, the higher the quality of speech output can be ensured.

Based on the linguistic analysis, the front end 171 may generate linguistic prosody of which annotation is processed to prosodic characteristics so that phonetic units represent how final acoustic units has to be pronounced in a final output speech.

The prosodic characteristics may be referred to as acoustic features. While an operation of this step is performed, the front end 171 may integrate the acoustic features into the TTS module 170 in consideration of random prosodic annotations that accompanies a text input. Such acoustic features may include pitch, energy, duration, etc. Application of the acoustic features may be based on prosodic models that can be used by the TTS module 170. Such prosodic models represent how phonetic units are to be pronounced in a specific situation. For example, the prosodic models may take into consideration of a phoneme's position in a syllable, a syllable's position in a word, a word's position in a sentence or phrase, neighboring phonetic units, etc. Likewise to the language dictionary, the more information on prosodic models exists, the higher the quality of speech output is ensured.

An output from the front end 171 may include a series of phonetic units which are annotation-processed into prosodic characteristics. The output from the front end 171 may be referred to as symbolic linguistic representation. The symbolic linguistic representation may be transmitted to the speech synthesis engine 172. The speech synthetic engine 172 may convert the speech into an audio wave so as to output the speech to a user through the audio output device 110. The speech synthesis engine 172 is configured to convert an input test into a high-quality natural speech in an efficient way. Such a high-quality speech may be configured to be pronounced in a similar way of a human speaker as much as possible.

The speech synthesis engine 172 may perform synthesis using at least one or more other methods.

The unit selection engine 173 compares a recorded speech database with a symbolic linguistic representation generated by the front end 171. The unit selection engine 173 matches the symbol linguistic representation and a speech audio unit in the recorded speech database. In order to form a speech output, matching units may be selected and the selected matching units may be connected to each other. Each unit includes audio waveforms, which correspond to a phonetic unit such as a short WAV file of specific sound along with description of various acoustic features associated with the WAV file (pitch, energy, etc.), and also includes other information such as a position at which the phonetic unit is represented in a word, a sentence, a phrase, or a neighboring phonetic unit.

The unit selection engine 173 may match an input text using all information in a unit database in order to generate a natural waveform. The unit database may include examples of multiple speech units that provide different options to the TTS device 100 to connect the units to a speech. One of advantages of unit selection is that a natural speech output can be generated depending on a size of the database. In addition, the greater the unit database, the more natural the speech can be constructed by the TTS device 100.

Meanwhile, speech synthesis can be performed not just by the above-described unit selection synthesis, but also by parameter synthesis. In the parameter synthesis, synthesis parameters such as frequency, volume, and noise can be varied by a parameter synthesis engine 175, a digital signal processor, or a different audio generating device in order to generate artificial speech waveforms.

The parameter synthesis may match symbolic linguistic representation with a desired output speech parameter by using an acoustic model and various statistical techniques.

In the parameter synthesis, a speech can be processed even without a large-capacity database related to unit selection and a processing can be performed at a high speed. The unit selection synthesis technique and the parameter synthesis technique may be performed individually or in combination to thereby generate a speech audio output.

The parameter speech synthesis may be performed as follows. The TTS module 170 may include an acoustic model that can transform symbolic linguistic representation into a synthetic acoustic waveform of a test input based on audio signal manipulation. The acoustic model may include rules that can be used by the parameter synthesis engine 175 to allocate specific audio waveform parameters to input phonetic units and/or prosodic annotations. The rules may be used to calculate a score indicating a probability that a specific audio output parameter (frequency, volume, etc.) may correspond to input symbolic linguistic representation from the pre-processor 171.

The parameter synthesis engine 175 may apply multiple techniques to match a speech to be synthesized with an input speech unit and/or a prosodic annotation. One of general techniques employs Hidden Markov Model (HMM). The HMM may be used to determine a probability for an audio output to match a text input. In order to artificially synthesize a desired speech, the HMM may be used to convert linguistic and acoustic space parameters into parameters to be used by a vocoder (digital voice encoder).

The TTS device 100 may include a speech unit database to be used for unit selection.

The speech unit database may be stored in the TTS storage 180, the storage 160, or another storage configuration. The speech unit database may include a recorded speech voice. The speech voice may be a text corresponding to utterance contents. In addition, the speech unit database may include a recorded speech (in the form of an audio waveform, a feature factor, or another format) occupying a considerable storage space in the TTS device 100. Unit samples in the speech unit database may be classified in various ways including a phonetic unit (a phoneme, a diphone, a word, and the like), a linguistic prosody label, an acoustic feature sequence, a speaker identity, and the like.

When matching symbolic linguistic representation, the speech synthesis engine 172 may select a unit in the speech unit database that most closely matches an input text (including both a phonetic unit and a prosodic symbol annotation). In general, the large the capacity of the speech unit database, the more the selectable unit samples and thus the more accurate the speech output.

Audio waveforms including a speech output to a user may be transmitted to the audio output device 110 from the TTS module 170 so that the audio waveforms are output to a user. Audio waveforms including a speech may be stored in multiple different formats such as feature vectors, non-compressed audio data, or compressed audio data. For example, an audio output may be encoded and/or compressed by an encoder/decoder before the transmission. The encoder/decoder may encode or decode audio data such as digitalized audio data, feature vectors, etc. In addition, the function of the encoder/decoder may be included in an additional component or may be performed by the processor 140 and the TTS module 170.

Meanwhile, the TTS storage 180 may store different types of information for speech recognition.

Contents in the TTS storage 180 may be prepared for general TTS usage and may be customized to include sound and words that can be used in a specific application. For example, for TTS processing by a GPS device, the TTS storage 180 may include a customized speech specialized in position and navigation.

In addition, the TTS storage 180 may be customized to a user based on a personalized desired speech output. For example, the user may prefer an output voice of a specific gender, a specific accent, a specific speed, a specific emotion (e.g., a happy voice). The speech synthesis engine 172 may include a specialized database or model to explain such user preference.

The TTs device 100 may perform TTS processing in multiple languages. For each language, the TTS module 170 may include data, instructions, and/or components specially configured to synthesize a speech in a desired language.

For performance improvement, the TTS module 213 may modify or update contents of the TTS storage 180 based on a feedback on a TTS processing result, and thus, the TTS module 170 may improve speech recognition beyond a capability provided by a training corpus.

As the processing capability of the TTS device 100 improves, a speech output is possible by reflecting an attribute of an input text. Alternatively, although an emotion attribute is not included in the input text, the TTS device 100 may output a speech by reflecting intent (emotion classification information) of a user who has written the input text.

Indeed, when a model to be integrated into a TTS module for performing TTS processing is established, the TTS system may integrate the above-described various configurations and other configurations. For example, the TTS device 100 may insert an emotion element into a speech.

In order to output the speech added with the emotion classification information, the TTS device 100 may include an emotion insertion module 177. The emotion insertion module 177 may be integrated into the TTS module 170 or integrated as a part of the pre-processor 171 or the speech synthesis engine 172. The emotion insertion module 177 may realize emotion classification information-based TTS using metadata that corresponds to an emotion attribute. According to an embodiment of the present invention, the metadata may be in markup language and preferably in speech synthesis markup language (SSML). A method of performing emotion classification information-based TTS using SSML will be hereinafter described in detail.

Figure 8:
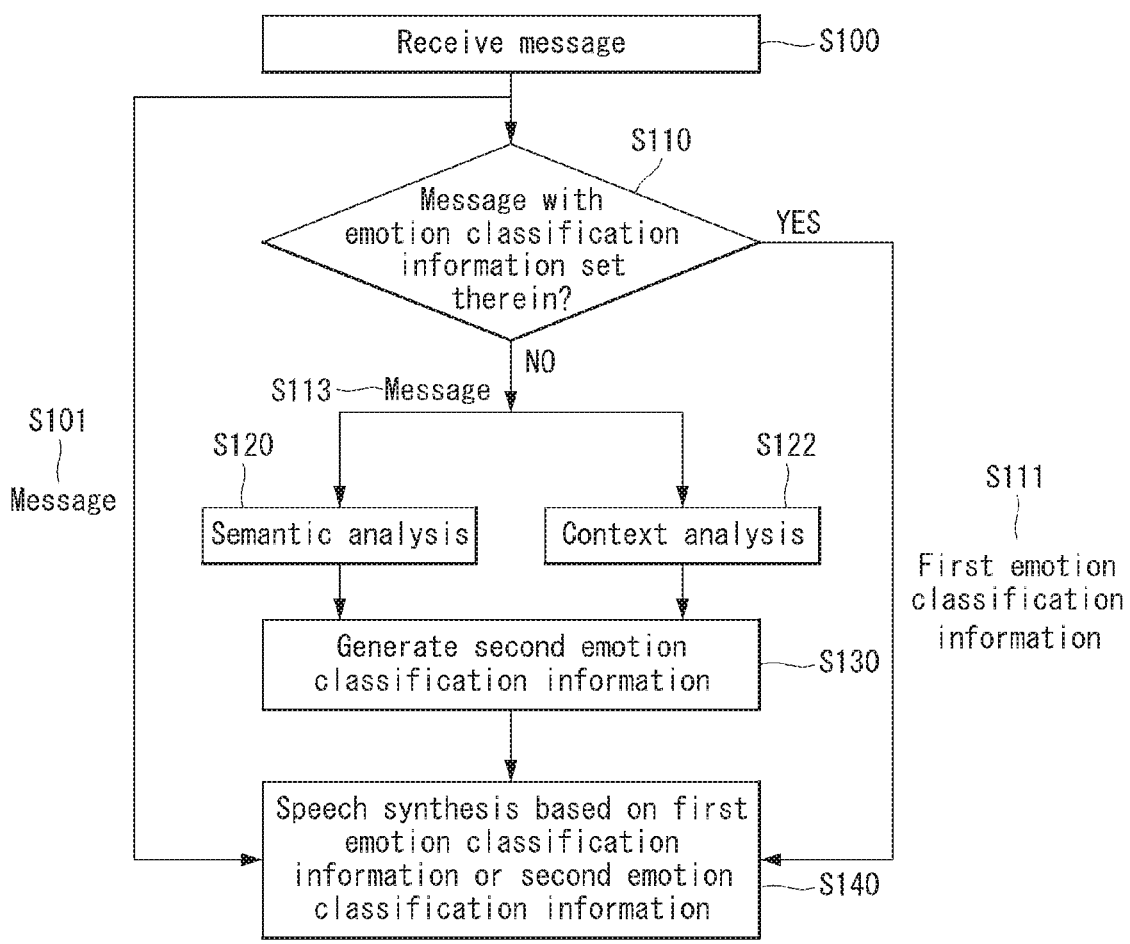
FIG. 8 is a flowchart of an emotion classification information-based TTS method according to an embodiment of the present invention.

FIG. 8 is a flowchart of an emotion classification information-based TTS method according to an embodiment of the present invention.

The emotion classification information-based TTS method according to an embodiment of the present invention may be implemented by the TTS device described with reference to FIGS. 1 to 7. Hereinafter, the emotion classification information-based TTS method according to an embodiment of the present invention and operations of a TTS device to implement the TTS method will be described in detail.

Meanwhile, as described above, the emotion classification information-based TTS method according to an embodiment of the present invention is described in the assumption that communication between two users U1 and U2 are implemented through a part of the communication system shown in FIG. 3. In addition, the description is provided in the assumptions that a test message transmitted by a transmitting user U1 is received through a receiving device 14 of a receiving user U2, that the receiving device 14 may correspond to the TTS device 100 shown in FIG. 7, and that a final speech outputting operation is performed by adding emotion classification information to a speech corresponding to the text message transmitted by the transmitting user U1 through the TTS device 100.

Referring to FIG. 8, the TTS 100 may receive a message (S100).

The TTS device 100 may transmit the received message to a speech synthesis engine (S101).

In addition, the TTS device 100 may determine whether the received message is a message in which emotion classification is set (S110).

The emotion classification information may be set in the message with being classified as at least one of neutral, love, happy, anger, sad, worry, or sorry. An operation of writing and transmitting the message by the transmitting device will be described in more detail with reference to FIGS. 17A and 17B. The message is not limited to a message received through a wireless communication unit from the transmitting device and may include a message input through the input device 120 described with reference to FIG. 7.

When first emotion classification information is set in the message (S100:YES), the TTS device 100 may transmit first metadata corresponding to the first emotion classification information to a speech synthesis engine (S111). Here, the speech synthesis engine may be the TTS module 170 described with reference to FIG. 7 or may be the speech synthesis engine 172 included in the TTS module 170. The speech synthesis engine may output a speech corresponding to the received message in a manner in which the first emotion classification information is added to the speech.

When no emotion classification information is set in the received message, the TTS device 100 may generate second emotion classification information from the received message through an inferring process. To this end, the TTS device 100 may transmit the received message to a semantic analysis module and a context analysis module (S113).

Here, the second emotion classification information is differentiated from the first emotion classification information, and the first emotion classification information is emotion classification information that is set by the transmitting device, which has transmitted the message, when writing the message. In addition, the second emotion classification information is defined as emotion classification information that is newly generated through analysis of a message received by the TTS device 100 when no emotion classification information is set in the message transmitted by the transmitting device.

The TTS device 100 may analyze semantics in a sentence of the received message (S120).

The message may be composed of at least one sentence, and semantic analysis in the sentence may be based on an emotion element by which emotion contained in the sentence can be inferred. The emotion element by which emotion can be inferred may include at least one of symbol, emoticon, or a text (word). Thus, the semantic analysis in the sentence may be determined that each sentence has different emotion classification information.

In addition, although identical texts are given, intent of a user transmitting the texts may differ, and thus, the TTS device 100 may infer emotion through semantic analysis in the sentence based on various emotion elements.

Meanwhile, when a plurality of emotion elements is extracted from one sentence, the TTS device 100 may combine the plurality of emotion elements to thereby infer emotion classification information that is to be reflected in the sentence. In addition, when a plurality of emotion elements exist in one sentence, the TTS device 100 may additionally assign a greater weight to a result value of context analysis to thereby generate second emotion information.

In addition, the TTS device 100 may analyze context between multiple sentences that forms the received message (S122).

The TTS device 100 may generate the second emotion classification information based on overall context of a message. Although identical sentences are given, semantic analysis of the sentences may not be performed, and, although the identical sentences are given, emotion of a message transmitting person may change over time during overall message transmitting and receiving processes. In this case, it is necessary to generate second emotion classification information in consideration of context of the entire message.

The TTS device 100 may generate the second emotion classification information based on a semantic analysis result and/or a context analysis result in the sentence (S130).

The speech synthesis engine may perform speech synthesis so that the first emotion classification information or the second emotion classification information are reflected in the course of outputting a speech corresponding to the received message (S140).

The first emotion classification information and the second emotion classification information transmitted to the speech synthesis engine may be transmitted in a metadata form. The metadata may be in markup language such as speech synthesis markup language (SSML). Representation described in SSML may include the above-described emotion element. Emotion classification information to be transmitted to the speech synthesis engine will be described in detail with reference to FIGS. 14 and 15.

As such, when first emotion classification information is set in a received message or when no emotion classification information is set in the received message, the TTS device 100 may generate second emotion classification information through semantic analysis and context analysis in a sentence to thereby perform emotion classification information-based speech synthesis.

Hereinafter, a more detailed process of generating second emotion classification information will be described with reference to FIGS. 9 to 13.

Figure 9:
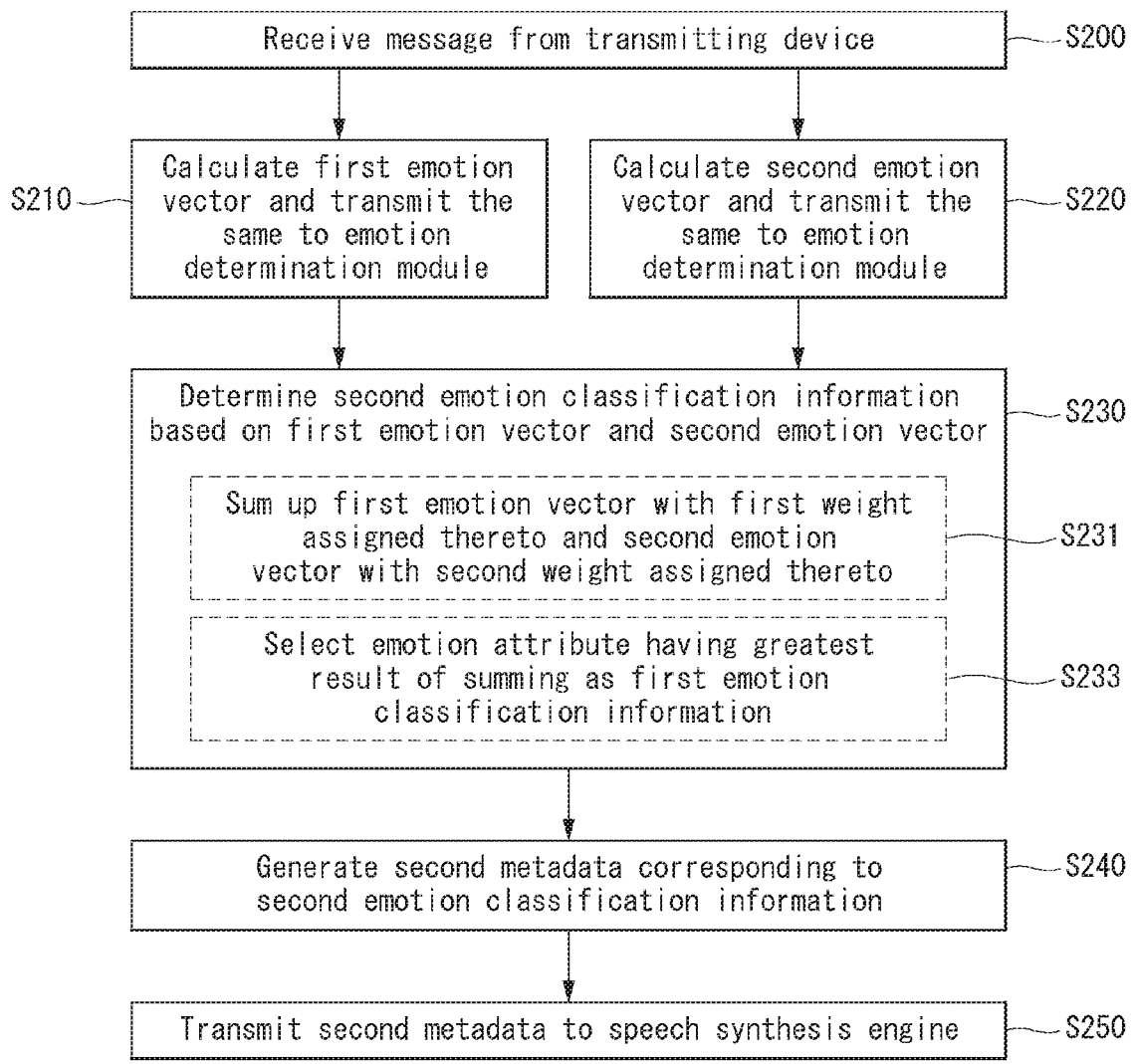
FIG. 9 is a flowchart of an emotion classification information-based TTS method in which emotion classification information is newly generated when no emotion classification information is set in a received message according to an embodiment of the present invention.

FIG. 9 is a flowchart of an emotion classification information-based TTS method in which emotion classification information is newly generated when no emotion classification information is set in a received message according to an embodiment of the present invention. The emotion classification information-based TTS method according to an embodiment of the present invention may be implemented by the TTS device described with reference to FIGS. 1 to 7.

In addition, the TTS device 100 according to an embodiment of the present invention may further include a semantic analysis module, a context analysis module, and an emotion determination module, and the semantic analysis module, the context analysis module, and the emotion determination module may be integrated into the TTS device 100 shown in FIG. 7 or into the speech synthesis engine 172 or the emotion insertion module 177 of the TTS device 100 and may be stored in a processor for controlling overall operations of the TTS device 100 or in a memory as a software program.

Referring to FIG. 9, the TTS device 100 may receive a message from a transmitting device (S200). The TTS device 100 may transmit the received message to the semantic analysis module and the context analysis module.

The semantic analysis module may calculate a first emotion vector based on an emotion element, which is included in the message to infer emotion, and may transmit the first emotion vector to the emotion determination module (S210).

The first emotion vector, which represents an emotion item as one of neural, love, happy, anger, and the like, may be defined as a weight assigned to each of the above-described plurality of emotion elements (or emotion items or emotion attributes). Here, a sum of weights respectively assigned to the plurality of emotion elements may be normalized.

For example, FIG. 10 is a diagram for explaining an emotion vector according to an embodiment of the present invention. FIG. 10, if a received message M1 is "Love you", the TTS device 100 calculates a first emotion vector through the syntactic analysis module, and the first emotion vector may be a vector in which weights are set to a plurality of emotion elements EA1, EA2, EA3, EA4, and EA5). For example, the first emotion vector is an emotion vector containing emotion classification information that is generated by assigning a weight "0" to neutral EA1, anger EA4 and sad EA5, a weight "0.9" to love EA2, and a weight "0.1" to happy EA3 with respect to the message M1 of "Love you".

Meanwhile, although FIG. 10 shows an example of generating an emotion vector based on semantics of a word (or text) in a sentence, different vectors may be set even though semantic contents of a text are identical.

FIG. 11 shows another example of calculating a first emotion vector by analyzing semantics of a message when no emotion classification information is set in a received message according to an embodiment of the present invention.

Referring to FIG. 11, a received message "Where are you" may have the same semantic meaning in cases (a), (b), and (c), but the TTS device 100 according to an embodiment of the present invention may calculate different emotion vectors in the respective cases (a), (b), and (c).

For example, in the case (a), the symbol used together with the text (Where are you) is a question mark and as it is determined as a neural emotion element, and thus a first emotion vector for "Where are you?" may be calculated by assigning a weight "1" to "neural" among the multiple emotion items. In addition, in the case (b), the symbols used together with the text (Where are you) is a question mark "?" and a diacritical mark "ˆˆˆ", and a first emotion vector for "Where are you?ˆˆˆ" may be calculated by assigning weights 0.6 and 0.4 to "love" and "happy" among the multiple emotion items. In addition, in the case (c), the symbol used together with the text (Where are you) is a combination of diacritical symbols "-- ;;" and a first emotion vector for "Where are you"--;;" may be calculated by assigning weights 0.8 and 0.2 to "anger" and "sad" among the multiple emotion items. That is, although messages having the same content are received, the TTS device 100 may calculate different first emotion vectors by analyzing semantic meanings in sentences.

Referring back to FIG. 9, the context analysis module may calculate a second emotion vector based on overall context of the message, and transmit the second emotion vector to the emotion determination module (S220).

Hereinafter, a process of calculating a second emotion vector through context analysis will be described with reference to FIG. 12.

FIG. 12 shows an example of calculating a second emotion vector by analyzing context of a received message when no emotion classification information is set in the received message according to an embodiment of the present invention.

Referring to FIG. 12, in the cases (a) and (b), multiple sentences may be included in a received message, and different second emotion vectors may be set for the current sentence "Where are you?" M22. For example, in the case (a), a determination is made only based on the current sentence "Where are you?", a weight "1" may be assigned to a emotion item of neutral, yet, if a previous sentence "Miss you" is considered through context analysis, a greater weight may be assigned to the emotion item "love" or "happy" in the current sentence "Where are you". In this case, the case where all weights are assigned to "love" is described. In addition, in the case (b), if a determination is made only based on "Where are you?", a weight "1" may be assigned to the emotion item of neutral, yet, if the previous sentence "You are already late", weights of 0.8 and 0.2 may be assigned to the emotion items "anger" or "sad" in the current sentence "Where are you?" and thereby a second emotion vector may be calculated.

Referring to FIG. 9, a first emotion vector calculated from a sentence by the semantic analysis module and a second emotion vector calculated from a sentence by the context analysis module may be transmitted to the emotion determination module, and the emotion determination module may determine second emotion classification information based on the first emotion vector and the second emotion vector (S230).

More specifically, the emotion determination module sums up a first vector with a first weight assigned thereto and a second emotion vector with a second weight assigned thereto (S231). In addition, the emotion determination module may select an emotion attribute having the greatest value as a result of the summing as the second emotion classification information (S233).

FIG. 13 shows an example of determining final emotion classification information based on a first emotion vector and a second emotion vector when no emotion classification information is set in a received message according to an embodiment of the present invention.

Referring to FIG. 13, the emotion determination module may determine the second emotion classification information with respect to a received message M3.

$$EV = Ws \times EVs + Wc \times EVc \qquad \text{[Equation 1]}$$

Here, EV denotes an emotion vector, Ws denotes a first weight assigned to the first emotion vector according to semantic analysis of a sentence, EVs denotes a the first vector, Wc denotes a second weight assigned to a second emotion vector according to context analysis, and EVc denotes the second emotion vector. In addition, a sum of the first weight Ws and the second weight Wc is 1.

According to a result of semantic analysis of the current sentence (Where are you?) of the received message M3, the first emotion vector EVs may be given with weights of 0.6 and 0.4 respectively for the emotion vector items "love" and "happy". In addition, according to a result of context analysis, the second emotion vector EVc may be given with a weight 1.0 for the emotion item "love".

Here, the emotion determination module may adaptively adjust setting of the first weight Ws and the second Wc, depending on a proportion of how much the semantic analysis result and the context analysis result respectively contribute to determination of overall emotion classification information of a message.

Each of the first weight Ws and the second weight Wc may be initially set to 0.5, and, for example, if it is determined that sentences forming the message has a continuity, the second weight Wc may be increased than the first weight Ws, as shown in FIG. 13. According to an embodiment, the emotion determination module may apply the first weight Ws to the first emotion vector EVs, apply the second weight Wc to the second emotion vector EVc, and sum up the two emotion vectors. As a result of the summing, vector values respectively corresponding to multiple emotion items forming an emotion vector EV may be calculated. For example, it may be calculated into 0.0 for "neutral", 0.84 for "love", 0.016 for "happy", 0.0 for "anger", and "0.0 for "sad".

The emotion determination module may select an emotion item ("love") having the greatest value (0.84) among the calculated vector values as final emotion classification information (the second emotion classification information).

Referring back to FIG. 9, the TTS device 100 may generate the selected second emotion classification information in a second metadata form (SSML form) (S240), and transmit the second emotion classification to the speech synthesis engine (S250).

The speech synthesis engine may perform control to reflect the second emotion classification information in an output speech. For example, the final emotion classification information may be transmitted to the unit selection engine 173 or the parameter synthesis engine 175 of the emotion insertion module 177 shown in FIG. 7 and thereby a final synthesize speech may be output through the audio output device 110.

Meanwhile, the emotion determination module may determine that a result value of semantic analysis of a sentence contributes greatly in determining classification information when an emotion expression is directly included in a message (e.g., when a punctuation mark, such as an emoticon, directly expressing emotion is included in a sentence), and then may increase the first weight Ws.

In addition, the TTS device 100 may store the first weight and the second weight as a history for each person who sends the message. For example, as for emotion classification information which is used when the TTS device outputs a speech of a message received from a first user, the first weight is reflected significantly more than the second weight, and, if this pattern is repeated, when the TTS device outputs the message received from the first user after speech synthesis, an initial set value for the first weight may be set to be greater than that for the second weight.

As such, a process in which the TTS device performs speech synthesis by adding emotion classification information to a received message and outputs a result of the speech synthesis has been described. Hereinafter, a process of processing speech data and transmitting the processed speech data to the TTS device so as to perform enable speech synthesis with emotion classification information will be described with reference to FIGS. 14 and 15.

Figure 14:
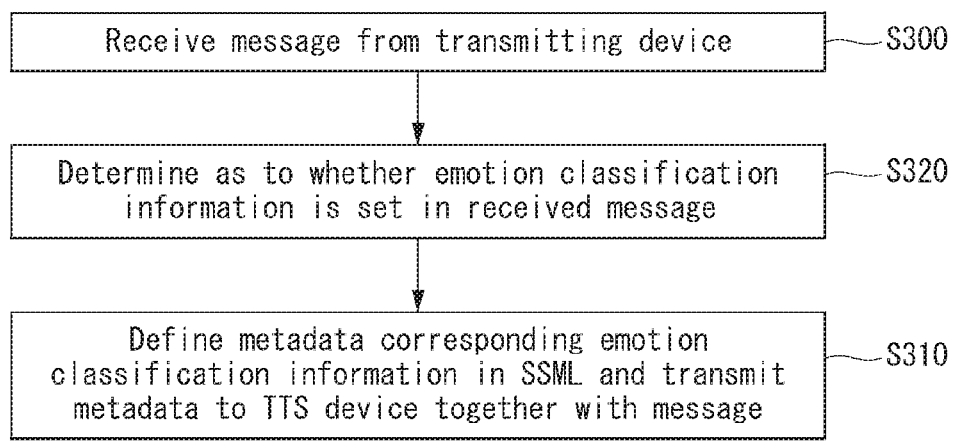
FIG. 14 is a flowchart of an emotion classification information-based TTS method according to an embodiment of the present invention.

FIG. 14 is a flowchart of an emotion classification information-based TTS method according to an embodiment of the present invention. The embodiment disclosed in FIG. 14 may be performed between a transmitting device and a TTS device or may be integrated into and performed by the TTS device. Hereinafter, an example in which the embodiment is performed by the TTS device is described in FIG. 14, but the present invention is not limited thereto.

The emotion classification information-based TTS method according to an embodiment of the present invention may be performed by the TTS device described with reference to FIGS. 1 to 7. In addition, the embodiment disclosed in FIG. 14 may be performed by embodiments described with reference to FIGS. 8 to 13 and may be performed in combination with at least a part of the embodiments described with reference to FIGS. 8 to 13.

Referring to FIG. 14, the emotion classification information-based TTS method according to an embodiment of the present invention may receive a message from a transmitting device (S300). A TTS device may determine whether emotion classification information is set in the received message (S320). A process of receiving a message from the transmitting device is as the same as described above.

When it is determined that emotion classification information is set in the received message, the TTS device may transmit metadata corresponding to the emotion classification information to the TTS device, together with the message (S310).

The metadata may be transmitted in various ways. For example, the metadata may be in markup language such as extensible markup language (XML) and speech synthesis markup language (SSML). The SSML is the standard of markup language for synthesizing a speech and disclosed through https://www.w3.org/TR/2010/REC-speech-synthesis11-20100907/. The markup language may be composed of elements, and each of the elements has an attribute.

The TTS device according to an embodiment of the present invention may add "emotion" element to the SSML standard for the sake of emotion classification information. This may be described as <emotion="attribute">Sentence</emotion>, and an attribute value may be represented as emotion classification information such as neutral, love, happy, anger, sad, worry, sorry, and the like, as described above. In addition, the attribute value may extend to various forms.

For example, FIG. 15 shows an example in which emotion classification information is described in SSML according to an embodiment of the present invention. Referring to FIG. 15, "xml version" is an element representing xml version, "speak version" is an element representing SSML version, and "s" is an element representing a sentence.
 <emotion="happy">I will wait.</emotion>
 <emotion="love">Love you.</element>

As emotion classification information is added above, the TTS device may perform speech synthesis so as to utter "I will wait" in a happy tone and "Love you" in an adorable tone.

According to an embodiment of the present invention, an example in which, when emotion classification information is set in a received message, the TTS device processes the set emotion classification information into metadata in SSML form and transmits the metadata to the speech synthesis engine has been described; however, a transmission unit (a transmission apparatus) for generating the metadata may be provided independently of the transmitting device and the receiving device. Yet, in this case, when no emotion classification information is set in a message transmitted by the transmitting device, a function of transmitting the received message to the TTS device is performed alone, and the TTS device may perform speech synthesis by generating second emotion classification information through the above-described process.

Figure 16:
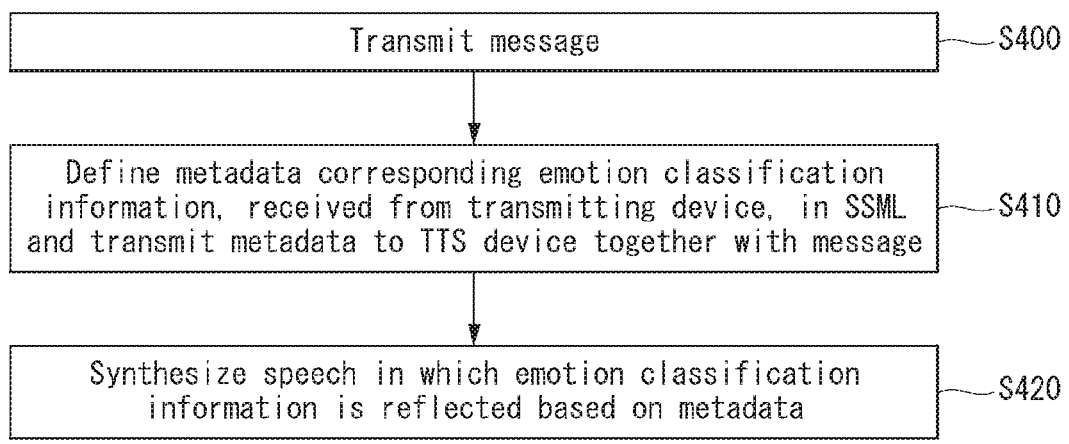
FIG. 16 is a flowchart for explaining an operation of a TTS system according to an embodiment of the present invention.

FIG. 16 is a flowchart for explaining an operation of a TTS system according to an embodiment of the present invention.

A emotion classification information-based TTS system according to an embodiment of the present invention may include; a transmitting device configured to transmit a message; and a TTS device configured to define metadata, corresponding to emotion classification information extracted through semantic analysis and context analysis of the message received from the transmitting device, in SSML form and synthesize the message and a speech in which the emotion classification information is reflected based on a server and the metadata.

Referring to FIG. 16, an operation method of the TTS system may include transmitting a message by the transmitting device (S400). In addition, the metadata corresponding to emotion classification information received from the transmitting device may be defined in SSML form and transmitted to the TTS device together with the message (S410). A speech synthesis engine may synthesize a speech in which the emotion classification information is reflected based on the metadata (S420).

Here, a step of transmitting a message by setting emotion classification information by the transmitting device will be described in detail with reference to FIGS. 17A and 17B.

Figure 17A:
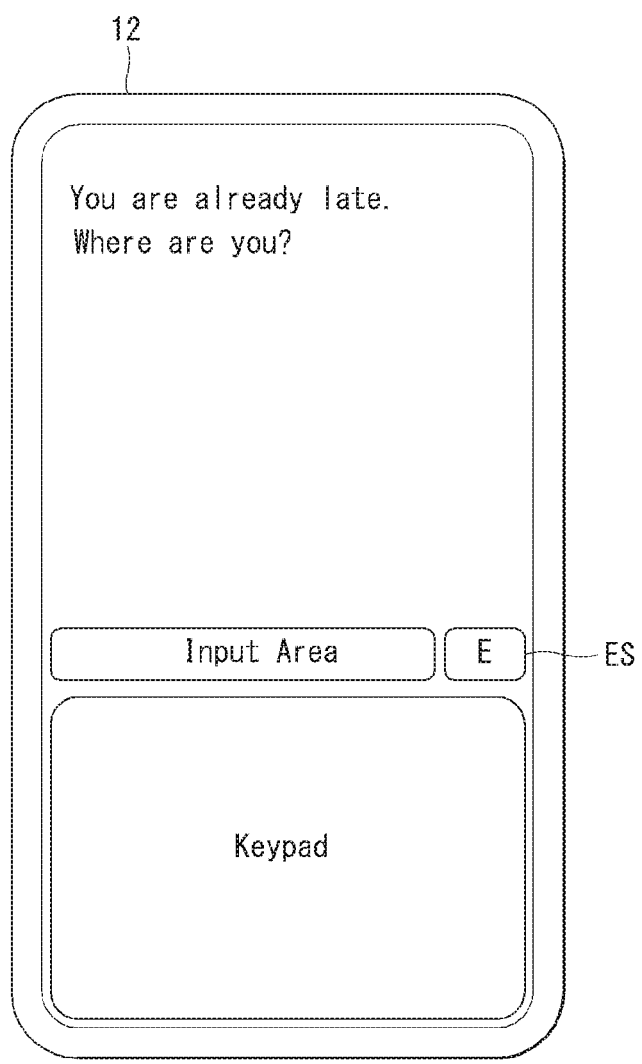
FIGS. 17A and 17B shows an example of transmitting a message with emotion classification information set therein according to an embodiment of the present invention.
Figure 17B:
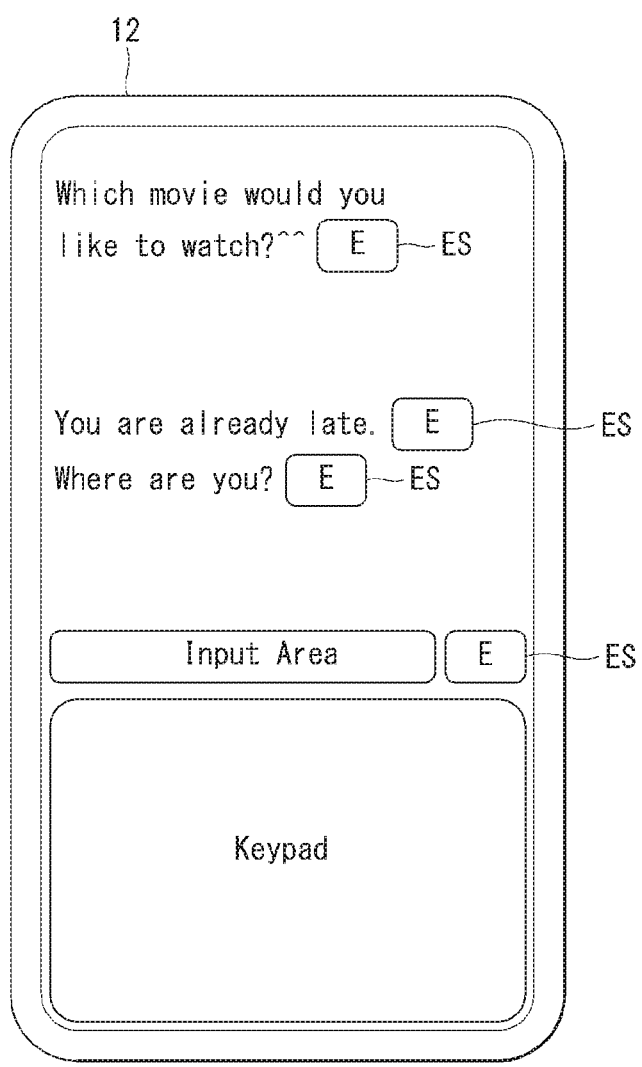

FIGS. 17A and 17B shows an example of transmitting a message with emotion classification information set therein according to an embodiment of the present invention.

Referring to FIG. 17A, the transmitting device 12 may execute an application for writing a text message and the text message may be input. In this case, an emotion setting menu Es may be provided. The emotion setting menu Es may be displayed as an icon. When the emotion setting menu ES is selected after the text message is input, the transmitting device 12 may display at least one emotion item on a display so that a user can select emotion classification information with respect to the input text message. According to an embodiment, the at least one emotion item may be provided as a pop-up window. According to an embodiment, at least one candidate emotion item frequently used by the user may be recommended as the at least one emotion item Meanwhile, referring to FIG. 17b, according to an embodiment, an emotion item may be set for each message (or each sentence). For example, when a predetermined time passes after a first sentence is input, an input message may be displayed on a message display window, and an emotion setting menu may be provided together with the message. Accordingly, when a sentence is completed, emotion classification information desired by a user may be set in the complete sentence itself.

In addition, according to an embodiment, after a specific emotion item is selected, the specific emotion item may be changed before transmission of a message.

In addition, according to an embodiment, the transmitting device may recommend an emotion item to be set together with a message, depending on a person who is to receive the message. Alternatively, according to an embodiment, the transmitting device 12 may learn a user's emotion item setting pattern and automatically set and display emotion classification information by taking into consideration of message content and context with a previous sentence.

Meanwhile, the transmitting device 12 may receive a text message through speech recognition. In this case, the transmitting device 12 may automatically set emotion classification information of a user from an input voice by analyzing spectrum of an input speech. Alternatively, the transmitting device 12 may include a user speech analysis engine, thereby enabled to learn difference between a previously input speech and emotion of the user and automatically extract emotion classification information from the user's input speech based on learning data.

FIGS. 17A and 17B assumes the case where there is a function of setting emotion classification information in a message to be transmitted when the message is received from the transmitting device 12, yet the present invention is not limited thereto. For example, if the transmitting device 12 does not have the above-described emotion classification setting function, emotion classification information-based TTS may be performed through an operation of generating second emotion classification information, disclosed in FIGS. 8 to 13.

A text-to-speech (TTS) device enabling multiple speakers to be set according to another aspect of the present invention may include: a communication unit configured to receive a message; a speech synthesis unit configured to synthesize a speech corresponding to the message; and a processor configured to, based on whether emotion classification information is set in the received message, control the speech synthesis unit to perform speech synthesis based on the emotion classification information.

The processor may be configured to: when first emotion classification information is set in the message, deliver first metadata corresponding to the first emotion classification information to the speech synthesis unit; and when no emotion classification information is set in the message, generate second emotion classification information based on semantic analysis and context analysis of the message and deliver second metadata corresponding to the second emotion classification to the speech synthesis unit.

The speech synthesis unit may be configured to synthesize a speech corresponding to the message by adding emotion classification information that is determined based on any one of the first metadata and the second metadata.

A computing device according to yet another aspect of the present invention includes: a processor; and a memory including an instruction executable by the processor, and the instruction is used to determine as to whether emotion classification information is set in the received message.

The instruction is used to, when a first emotion classification information is set in the message, transmit first metadata corresponding to the first emotion classification information to a speech synthesis engine and to, when no emotion classification information is set in the message, generate second emotion classification information based on at least one of an emotion element included in the message, by which emotion can be inferred, or context of the message and transmit second metadata corresponding to the second emotion classification information to the speech synthesis engine.

The speech synthesis engine may synthesize a speech corresponding to the message by adding emotion classification information that is determined based on any one of the first metadata and the second metadata.

A text-to-speech (TTS) method according to an embodiment of the present invention may be applied in various patterns. That is, the TTS method according to an embodiment of the present invention may be applied in various ways in addition to a case where a speech is synthesized by carrying emotion in a received message.

For example, the TTS method according to an embodiment of the present invention may be applied to an audiobook. A conventional audiobook outputs contents in which speeches are synthesized with the same tone, but, if an embodiment of the present invention is applied, semantics and context of the audio book may be analyzed, thereby realizing an emotion classification information-based audiobook.

In addition, for example, multimedia contents (movies, drama, animation dubbing, etc.) conventionally output script lines with synthesized speeches of the same tone, but, if an embodiment of the present invention is applied, speeches synthesized with various types of emotion according to a script line and a situation, and thus, a diversity of user immersive content experience may be provided.

In addition, for example, a navigation device conventionally guides a route using synthesized speeches of the same tone, but, if an embodiment of the present invention is applied, a diversity tones are spoken according to a driving situation, and thus, it is possible to appropriately call attention to situations such as distracted driving and alert occurrence.

In addition, for example, while consulting, a chatbot may read script lines with a voice with various types of emotion and style applied according to a situation.

The above-described present invention can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. An emotion classification information-based text-to-speech (TTS) method comprising:
    receiving a message;
    based on a determination that a first emotion classification information is set in the received message, obtaining first metadata based on the first emotion classification information, wherein the first emotion classification information is set differently from text of the received message;
    based on a determination that no emotion classification information is set in the received message, generating second emotion classification information based on semantic analysis and context analysis of the received message and obtaining second metadata based on the second emotion classification; and
    synthesizing a speech corresponding to the received message by adding emotion classification information determined based on the first metadata or the second metadata, wherein the generating of the second emotion classification information comprises:
    determining a first emotion vector based on an emotion element included in the received message for inferring emotion;
    determining a second emotion vector based on an overall context of the received message, and
    summing up a first emotion vector with a first weight assigned thereto and a second emotion vector with a second weight assigned thereto, wherein the second emotional classification information is determined by selecting an emotional attribute with a greatest value as a result of the summing,
    when emotion representation is included in the received message, increasing the first weight and when multiple sentences forming the received message are related, increasing the second weight, wherein the first emotion vector is defined as a sum of weights that is normalized and assigned to a plurality of emotion attributes, wherein the second emotion vector is defined as a sum of weights that is normalized and assigned to a plurality of emotion attributes, and wherein the first weight and the second weight are defined through normalization.

2. The method of claim 1, wherein the first metadata and the second metadata are in markup language, and the markup language comprises speech synthesis markup language (SSML).

3. The method of claim 2,
wherein the SSML comprises an element representing an emotion attribute, and
wherein the emotion attribute comprises at least one of neutral, love, happy, anger, sad, worry or sorry.

4. The method of claim 1, wherein the second emotion classification information reflected in speech synthesis is determined based on the first emotion vector and the second emotion vector.

5. The method of claim 1, wherein the first weight and the second weight are stored as a history for a user sending the message.

6. The method of claim 1, wherein the weights assigned to multiple emotion attributes forming the first emotion vector are assigned in consideration of a symbol, emoji, or graphic object included in the message as a result of inferring of semantic contents included in the received message.

7. The method of claim 1, wherein the weights assigned to multiple emotion attributes forming the second emotion vector are assigned in consideration of context between sentences.

8. The method of claim 1, wherein the emotion element by which emotion can be inferred is defined as at least one of a character, an emoji, a symbol, or a graphic object included in the received message.

9. A text-to-speech (TTS) device enabling multiple speakers to be set, the device comprising:
a transceiver configured to receive a message; and
a processor configured to:
based on a determination of whether emotion classification information is set in the received message, control a performance of speech synthesis based on the emotion classification information;

based on a determination that a first emotion classification information is set in the received message, obtain first metadata based on the first emotion classification information, wherein the first emotion classification information is set differently from an input of the received message;

based on a determination that no emotion classification information is set in the received message, generate second emotion classification information based on semantic analysis and context analysis of the received message and obtain second metadata based on the second emotion classification, synthesize a speech corresponding to the received message by adding emotion classification information determined based on the first metadata and the second metadata, wherein the generating of the second emotion classification information comprises:

determine a first emotion vector based on an emotion element included in the received message or inferring emotion;

determine a second emotion vector based on an overall context of the received message, and sum up a first emotion vector with a first weight assigned thereto and a second emotion vector with a second weight assigned thereto, wherein the second emotional classification information is determined by selecting an emotional attribute with a greatest value as a result of the summing, when emotion representation is included in the received message, increase the first weight; and when multiple sentences forming the received message are related, increase the second weight, wherein the first emotion vector is defined as a sum of weights that is normalized and assigned to a plurality of emotion attributes, wherein the second emotion vector is defined as a sum of weights that is normalized and assigned to a plurality of emotion attributes, and wherein the first weight and the second weight are defined through normalization.

* * * * *